(12) United States Patent　(10) Patent No.: US 8,509,137 B2
Hindus et al.　(45) Date of Patent: Aug. 13, 2013

(54) METHOD AND APPARATUS FOR SENDING PRESENCE MESSAGES

(75) Inventors: Debby Hindus, San Francisco, CA (US); Elaine Brechin, Aberdeen (GB); Jesse L. Dorogusker, Menlo Park, CA (US); Anna E. Hagstrom, Menlo Park, CA (US); Scott D. Mainwaring, San Francisco, CA (US); Oliver T. Bayley, Pacifica, CA (US); Sigrid Moeslinger, New York, NY (US); Colin Burns, Aylesbury (GB); Donald C. Jackson, Monte Sereno, CA (US); Steve Guilhamet, San Francisco, CA (US); Brian J. Fogg, Mountain View, CA (US); Sean Michael White, San Francisco, CA (US)

(73) Assignee: Interval Licensing LLC, Seattle, WA (US)

( * ) Notice: Subject to any disclaimer, the term of this patent is extended or adjusted under 35 U.S.C. 154(b) by 0 days.

(21) Appl. No.: 13/209,198

(22) Filed: Aug. 12, 2011

(65) Prior Publication Data

US 2012/0038459 A1　Feb. 16, 2012

Related U.S. Application Data

(60) Division of application No. 11/178,255, filed on Jul. 8, 2005, now abandoned, which is a continuation of application No. 09/169,839, filed on Oct. 9, 1998, now Pat. No. 6,956,497.

(60) Provisional application No. 60/062,144, filed on Oct. 9, 1997, provisional application No. 60/103,814, filed on Oct. 8, 1998.

(51) Int. Cl.
*G08B 5/22*　(2006.01)

(52) U.S. Cl.
USPC .......................................... 370/313; 340/7.53

(58) Field of Classification Search
USPC ................ 370/313, 468; 340/8.1, 4.61, 4.62, 340/4.6, 7.1, 7.2, 7.23, 7.3, 7.53, 7.63, 539.11, 340/539.13; 705/7.25
See application file for complete search history.

(56) References Cited

U.S. PATENT DOCUMENTS 3,673,327 A　6/1972　Johnson et al.
3,891,829 A　6/1975　Dobras
(Continued)

FOREIGN PATENT DOCUMENTS

DE　3008190 A1　9/1981
FR　2607400 A1　6/1988
(Continued)

OTHER PUBLICATIONS

U.S. Appl. No. 11/178,255, filed Jul. 8, 2005, Hindus.
(Continued)

*Primary Examiner* — Edwin Holloway, III
(74) *Attorney, Agent, or Firm* — Perkins Coie LLP

(57) ABSTRACT

An intentional presence system in accordance with the present invention includes a transmitting device at a first physical location that is responsive to a command intentionally initiated by a first individual at the first physical location to develop a presence signal intended for a second individual at a second physical location. The intentional presence system further includes a receiving device located at the second physical location which is receptive to the presence signal and which is operative to generate an indication to the second individual of the first individual's presence with respect to the transmitting device.

9 Claims, 28 Drawing Sheets

(56) References Cited

U.S. PATENT DOCUMENTS

| | | |
|---|---|---|
| 3,894,756 A | 7/1975 | Ward |
| 4,057,794 A * | 11/1977 | Grossfield ............... 340/7.5 |
| 4,114,033 A | 9/1978 | Okamoto et al. |
| 4,172,969 A | 10/1979 | Levine et al. |
| 4,173,016 A * | 10/1979 | Dickson ............... 342/42 |
| 4,237,344 A | 12/1980 | Moore |
| 4,302,011 A | 11/1981 | Pepper, Jr. |
| 4,341,385 A | 7/1982 | Doyle et al. |
| 4,417,246 A | 11/1983 | Agnor et al. |
| 4,467,346 A | 8/1984 | Mori |
| 4,536,887 A | 8/1985 | Kaneda et al. |
| 4,597,495 A | 7/1986 | Knosby |
| 4,740,788 A | 4/1988 | Konneker |
| 4,780,883 A | 10/1988 | O'Connor et al. |
| 4,843,568 A | 6/1989 | Krueger et al. |
| 4,866,765 A | 9/1989 | Yang et al. |
| 4,873,398 A | 10/1989 | Hubby, Jr. |
| 4,873,520 A * | 10/1989 | Fisch et al. ............ 340/7.57 |
| 4,882,726 A | 11/1989 | Lang et al. |
| 4,885,765 A | 12/1989 | Shirakawa |
| 4,887,204 A | 12/1989 | Johnson et al. |
| 4,893,305 A | 1/1990 | Fernandez et al. |
| 4,940,963 A | 7/1990 | Gutman et al. |
| 4,975,694 A | 12/1990 | McLaughlin et al. |
| 4,998,010 A | 3/1991 | Chandler et al. |
| 5,006,983 A | 4/1991 | Wayne et al. |
| 5,007,105 A * | 4/1991 | Kudoh et al. ............ 455/344 |
| 5,013,047 A | 5/1991 | Schwab |
| 5,047,614 A | 9/1991 | Bianco |
| 5,082,286 A | 1/1992 | Ryan et al. |
| 5,086,394 A | 2/1992 | Shapira |
| 5,088,928 A | 2/1992 | Chan |
| 5,188,368 A | 2/1993 | Ryan et al. |
| 5,192,947 A * | 3/1993 | Neustein ............... 340/7.63 |
| 5,202,828 A | 4/1993 | Vertelney et al. |
| 5,231,649 A | 7/1993 | Duncanson |
| 5,257,307 A | 10/1993 | Ise |
| 5,267,323 A | 11/1993 | Kimura |
| 5,298,731 A | 3/1994 | Ett |
| 5,303,388 A | 4/1994 | Kreitman et al. |
| 5,330,380 A | 7/1994 | McDarren et al. |
| 5,335,011 A | 8/1994 | Addeo et al. |
| 5,337,358 A | 8/1994 | Axelrod et al. |
| 5,347,306 A | 9/1994 | Nitta |
| 5,359,422 A | 10/1994 | Fukushima et al. |
| 5,360,446 A | 11/1994 | Kennedy |
| 5,389,965 A | 2/1995 | Kuzma |
| 5,392,284 A | 2/1995 | Sugiyama |
| 5,396,265 A | 3/1995 | Ulrich et al. |
| 5,401,947 A | 3/1995 | Poland |
| 5,452,414 A | 9/1995 | Rosendahl et al. |
| 5,459,458 A | 10/1995 | Richardson et al. |
| 5,479,408 A | 12/1995 | Will |
| 5,481,610 A | 1/1996 | Doiron et al. |
| 5,483,261 A | 1/1996 | Yasutake |
| 5,487,181 A | 1/1996 | Dailey et al. |
| 5,511,148 A | 4/1996 | Wellner |
| 5,525,798 A | 6/1996 | Berson et al. |
| 5,537,336 A | 7/1996 | Joyce |
| 5,544,302 A | 8/1996 | Nguyen |
| 5,545,883 A | 8/1996 | Sasou et al. |
| 5,546,324 A | 8/1996 | Palmer et al. |
| 5,550,561 A | 8/1996 | Ziarno |
| 5,561,446 A | 10/1996 | Montlick |
| 5,572,643 A | 11/1996 | Judson |
| 5,586,216 A | 12/1996 | Degen et al. |
| 5,587,706 A | 12/1996 | Branner et al. |
| 5,590,396 A | 12/1996 | Henry |
| 5,600,115 A | 2/1997 | Balzano |
| 5,604,516 A | 2/1997 | Herrod et al. |
| 5,607,336 A | 3/1997 | Lebensfeld et al. |
| 5,640,193 A | 6/1997 | Wellner |
| 5,644,627 A | 7/1997 | Segal et al. |
| 5,646,524 A | 7/1997 | Gilboa et al. |
| 5,651,049 A | 7/1997 | Easterling et al. |
| 5,657,096 A | 8/1997 | Lukacs |
| 5,664,015 A | 9/1997 | Ford et al. |
| 5,666,215 A | 9/1997 | Fredlund et al. |
| 5,670,987 A | 9/1997 | Doi et al. |
| 5,674,003 A | 10/1997 | Andersen et al. |
| 5,684,885 A | 11/1997 | Cass et al. |
| 5,689,641 A | 11/1997 | Ludwig et al. |
| 5,693,693 A | 12/1997 | Auslander et al. |
| 5,729,251 A | 3/1998 | Nakashima et al. |
| 5,733,131 A | 3/1998 | Park |
| 5,734,724 A | 3/1998 | Kinoshita et al. |
| 5,739,814 A | 4/1998 | Ohara et al. |
| 5,765,151 A | 6/1998 | Senator |
| 5,790,138 A | 8/1998 | Hsu |
| 5,802,488 A | 9/1998 | Edatsune et al. |
| 5,804,803 A | 9/1998 | Cragun et al. |
| 5,812,430 A | 9/1998 | Altschuler et al. |
| 5,814,968 A | 9/1998 | Lovegreen et al. |
| 5,815,142 A | 9/1998 | Allard et al. |
| 5,826,253 A | 10/1998 | Bredenberg |
| 5,832,119 A | 11/1998 | Rhoads |
| 5,839,054 A | 11/1998 | Wright et al. |
| 5,841,978 A | 11/1998 | Rhoads |
| 5,848,413 A | 12/1998 | Wolff |
| 5,862,321 A | 1/1999 | Lamming et al. |
| 5,862,429 A | 1/1999 | Ueno et al. |
| 5,869,819 A | 2/1999 | Knowles et al. |
| 5,884,029 A | 3/1999 | Brush, II et al. |
| 5,886,337 A | 3/1999 | Rockstein et al. |
| 5,894,506 A | 4/1999 | Pinter |
| 5,898,457 A | 4/1999 | Nagao et al. |
| 5,903,729 A | 5/1999 | Reber et al. |
| 5,959,543 A | 9/1999 | LaPorta et al. |
| 5,970,122 A | 10/1999 | LaPorta et al. |
| 5,978,770 A | 11/1999 | Waytena et al. |
| 5,999,088 A | 12/1999 | Sibbitt |
| 6,006,159 A * | 12/1999 | Schmier et al. ............ 701/465 |
| 6,057,833 A | 5/2000 | Heidmann et al. |
| 6,098,882 A | 8/2000 | Antognini et al. |
| 6,199,048 B1 | 3/2001 | Hudetz et al. |
| 6,215,515 B1 | 4/2001 | Voois et al. |
| 6,219,045 B1 | 4/2001 | Leahy et al. |
| 6,262,711 B1 | 7/2001 | Cohen et al. |
| 6,282,206 B1 | 8/2001 | Hindus et al. |
| 6,351,271 B1 | 2/2002 | Mainwaring et al. |
| 6,380,967 B1 | 4/2002 | Sacca |
| 6,396,816 B1 | 5/2002 | Astle et al. |
| 6,448,978 B1 | 9/2002 | Salvador et al. |
| 6,529,786 B1 | 3/2003 | Sim |
| 6,683,993 B1 | 1/2004 | Mead |
| 6,754,546 B1 | 6/2004 | Hindus et al. |
| 6,938,074 B2 | 8/2005 | Bettis |
| 6,940,486 B2 | 9/2005 | Cohen et al. |
| 6,956,497 B1 | 10/2005 | Hindus et al. |
| 7,177,954 B1 | 2/2007 | van Allen et al. |
| 7,545,359 B1 | 6/2009 | Cohen et al. |
| 7,953,112 B2 | 5/2011 | Hindus et al. |
| 2001/0008398 A1 | 7/2001 | Komata |
| 2001/0037508 A1 | 11/2001 | Hindus et al. |
| 2009/0174654 A1 | 7/2009 | Cohen et al. |

FOREIGN PATENT DOCUMENTS

| | | |
|---|---|---|
| GB | 2103943 A | 3/1983 |
| GB | 2226468 A | 6/1990 |
| GB | 2237514 A | 5/1991 |
| JP | 4010743 A | 1/1992 |
| JP | 07093567 | 4/1995 |
| JP | 07108786 | 4/1995 |
| JP | 09204389 | 8/1997 |
| JP | 10171758 | 6/1998 |
| WO | WO-9803923 | 1/1998 |
| WO | WO-9919854 | 4/1999 |

OTHER PUBLICATIONS

Azuma, Ronald, "Tracking Requirements for Augmented Reality", vol. 36, No. 7, Communications of the ACM, Jul. 1993, 3 pages.

Bar Code Hotel, Feb. 20, 1995, Perry Hoberman, last accessed at http://www.itofisher.com/PEOPLE/PERRY/BarCodeHotel/ on Feb. 28, 2012, 5 pages.

Baudel, Thomas, et al "Charade: Remote Control of Objects using Free-Hand Gestures", vol. 36, No. 7, Communications of the ACM, Jul. 1993, 8 pages.
BinaryLabs, Inc., http://www.peoplepost.com, 1999, 2 pages [Web archive Internet accessed on Oct. 5, 2009].
Elrod, Scott, et al, "Responsive Office Environments", vol. 36, No. 7, Communications of the ACM, Jul. 1993, pp. 84-85.
Feiner, Steven, "Knowledge-Based Augmented Reality", vol. 36, No. 7, Communications of the ACM, Jul. 1993, pp. 53-62.
Fitzmaurice, G. W. et al., "Bricks: Laying the Foundations for Graspable User Interfaces" Human Factors in Computering Systems, CHI '95 Conf. Proceedings, Denver, May 7-11, 1995, p. 442-449.
Fitzmaurice, George W., "Situated Information Spaces and Spatially Aware Palmtop Computers" vol. 36, No. 7, Communications of the ACM, Jul. 1993, pp. 39-49.
Gold, Rich, "This is not a Pipe", vol. 36, No. 7, Communications of the ACM, Jul. 1993, 1 page.
Gorbet, Matthew G. et al, "Triangles: Tangible Interface for Manipulation and Exploration of Digital Information Topography", Apr. 18-23, 1998, CHI98, 8 pages.
Ishii, Hiroshi et al, "Tangible Bits: Towards Seamless Interfaces between People, Bits and Atoms", Mar. 22-27, 1997, CHI. pp. 234-241.
Knufer, "Technical Description of Dnufer's 'Station'," Mar. 1996, 11 pages.
Krueger, Myron W., "Environmental Technology: Making the Real World Virtual", vol. 36, No. 7, Communications of the ACM, Jul. 1993, pp. 36-37.
Mackay, Wendy, et al "Augmenting Reality: Adding Computational Dimensions to Paper", vol. 36, No. 7, Communications of the ACM, Jul. 1993, pp. 96-97.
PhoneMate, "Answering Machine & Cordless Telephone Easy to Use Owner's Guide," Apr. 1996, 40 pages.
Resnick, Mitchel, "Behavior Construction Kits", vol. 36, No. 7, Communications of the ACM, Jul. 1993, pp. 64-71.
Spreitzer, Mike et al, "Scalable, Secure, Mobile Computing with Location Information", vol. 36, No. 7, Communications of the ACM, Jul. 1993, p. 27.
Tanigawa, H., et al., "Personal Multimedia-Multipoint Teleconference System", Networking in the Nineties, Bal Harbour, vol. 3, Apr. 7, 1991, IEEE, p. 1127-1134.
Weiser, Mark, "Some Computer Science Issues in Ubiquitous Computing", vol. 36, No. 7, Communications of the ACM, Jul. 1993, pp. 75-83.
Wellner, Piere, "Interacting with Paper on the Digital Desk", vol. 36, No. 7, Communications of the ACM, Jul. 1993, pp. 87-95.
Wellner, Pierre, et al "Computer-Augmented Environments: Back to the Real World Introduction", vol. 36, No. 7, Communications of the ACM, Jul. 1993, pp. 24-26.

* cited by examiner

METHOD AND APPARATUS FOR SENDING PRESENCE MESSAGES

CROSS-REFERENCE TO RELATED APPLICATIONS

This application is a divisional of U.S. patent application Ser. No. 11/178,255, entitled METHOD AND APPARATUS FOR SENDING PRESENCE MESSAGES filed Jul. 8, 2005, which is incorporated herein in its entirety by reference for all purposes, which is a continuation of U.S. patent application Ser. No. 09/169,839, now U.S. Pat. No. 6,956,497, entitled METHOD AND APPARATUS FOR SENDING PRESENCE MESSAGES filed Oct. 9, 1998 which is incorporated herein in its entirety by reference for all purposes, which claims priority to U.S. Provisional Patent Application No. 60/062,144 filed Oct. 9, 1997, which is incorporated herein in its entirety by reference for all purposes, and claims priority to U.S. Provisional Patent Application No. 60/103,814 entitled METHODS AND APPARATUS FOR REMOTE SOCIAL INTERACTIONS filed Oct. 8, 1998, which is incorporated herein in its entirety by reference for all purposes. This Application is also related to (a) U.S. patent application Ser. No. 09/169,750, now U.S. Pat. No. 6,351,271 entitled METHOD AND APPARATUS FOR SENDING AND RECEIVING LIGHTWEIGHT MESSAGES filed Oct. 9, 1998, (b) Ser. No. 09/169,638, now U.S. Pat. No. 6,754,546 entitled ELECTRONIC AUDIO CONNECTION SYSTEM AND METHODS FOR PROVIDING SAME filed Oct. 9, 1998, and (c) Ser. No. 09/169,713, now U.S. Pat. No. 6,282,206 entitled VARIABLE BANDWIDTH COMMUNICATION SYSTEMS AND METHODS filed Oct. 9, 1998 all three being incorporated herein in their entireties by reference.

TECHNICAL FIELD

This invention relates generally to group communication systems, and more particularly to electronic group communications systems for remotely linking two or more geographically separated spaces for social interaction.

DESCRIPTION OF THE RELATED ART

Electronic communication systems technology provides an amazing number of ways for people to communicate with each other. Everyday examples of such communication systems include telephones, answering machines and pagers. Communication systems that are prevalent in the work place include computer networks, electronic mail ("e-mail"), fax machines, electronic whiteboards, as well as telephone and Internet conferencing.

While these communication systems competently serve their purposes, there is a lack of devices that relay information concerning the presence of individuals at remote locations for social purposes. Functionally, the closest analog to a social presence device is the real-world situation of living next door to a neighboring house. In such a situation, a person would notice various things about the neighbor's house (and patterns in the neighbor's activity) that would allow one to initiate a conversation at an opportune time, if one so wished. For example, if a person's car is in the driveway, and the lights in the house are on, her presence is communicated to her neighbors.

Such ongoing contact with friends and family is a fundamental human need, and one that current technologies meet in a less than optimal way. The options for technologically facilitating lightweight communication are few. Most technological solutions for communication are too heavy handed or complex to be lightweight. When people are in the same room, they can quickly and easily engage in lightweight communication by looking up and saying something.

Electronic communication over a distance rarely provides equivalent affordances. To communicate using typical electronic communication systems, a user is required to follow the many steps involved in finding a phone number or address, turning on the computer, picking up the phone or equivalent procedures. In the electronic world, a user cannot communicate with another by simply looking up and saying something. In addition, the tools for communication tend to be devoid of any emotional context or personal content.

In view of the foregoing, it is desirable to have flexible and subtle methods and apparatus for a user to intentionally communicate presence to friends, family and significant others. It is further desirable to have methods and apparatus for communicating different types of presence in a variety of different ways.

SUMMARY

The present invention fills these needs by providing methods and apparatus for communicating presence between parties. It should be appreciated that the present invention can be implemented in numerous ways, including as a process, an apparatus, a system, a device or a method. Several inventive embodiments of the present invention are described below.

An intentional presence system in accordance with the present invention includes a transmitting device at a first physical location that is responsive to a command intentionally initiated by a first individual at the first physical location to develop a presence signal intended for a second individual at a second physical location. The intentional presence system further includes a receiving device located at the second physical location which is receptive to the presence signal and which is operative to generate an indication to the second individual of the first individual's presence with respect to the transmitting device.

In an alternative embodiment of the present invention, the transmitting device is a first transmitting device, the receiving device is a first receiving device, and the presence signal is a first presence signal. This alternative embodiment further includes a second transmitting device at the second physical location that is responsive to a command intentionally initiated by the second individual at the second physical location to develop a second presence signal intended for the first individual at the first physical location, and a second receiving device located at the first physical location which is receptive to the second presence signal and which is operative to generate an indication to the first individual of the second individual's presence with respect to the second transmitting device.

A method for intentionally signaling a presence in accordance with the present invention includes transmitting from a first physical location in response to a command intentionally initiated by a first individual at the first physical location a presence signal intended for a second individual at a second physical location; and receiving at the second physical the presence signal and generating an indication to the second individual of the first individual's presence. The method preferably also includes transmitting from the second physical location in response to a command intentionally initiated by the second individual at the second physical location a second presence "signal intended for the first individual at the first physical location, and receiving at the first physical location the second presence signal and generating an indication to the first individual of the second individual's presence.

An advantage of the present invention is that it allows two or more individuals to maintain a feeling of closeness with each other by indicating presence or sending other lightweight messages without the interruption or imposition of a phone call or the effort of writing a letter or sending e-mail. Another advantage of the present invention is that it provides for lightweight communication devices that deliver message with a meaning inherent to the device itself, therefore allowing the device to operate at a low bandwidth.

Other aspects and advantages of the invention will become apparent from the following detailed description, taken in conjunction with the accompanying drawings, illustrating by way of example the principles of the invention.

DETAILED DESCRIPTION

Methods and apparatus for intentionally communicating presence between parties are disclosed. In the following description, numerous specific details are set forth to provide a thorough understanding of the present invention. One skilled in the art will understand that the present invention may be practiced without some or all of these specific details. In other instances, well known process operations have not been described in detail in order not to unnecessarily obscure the present invention.

Figure 1:
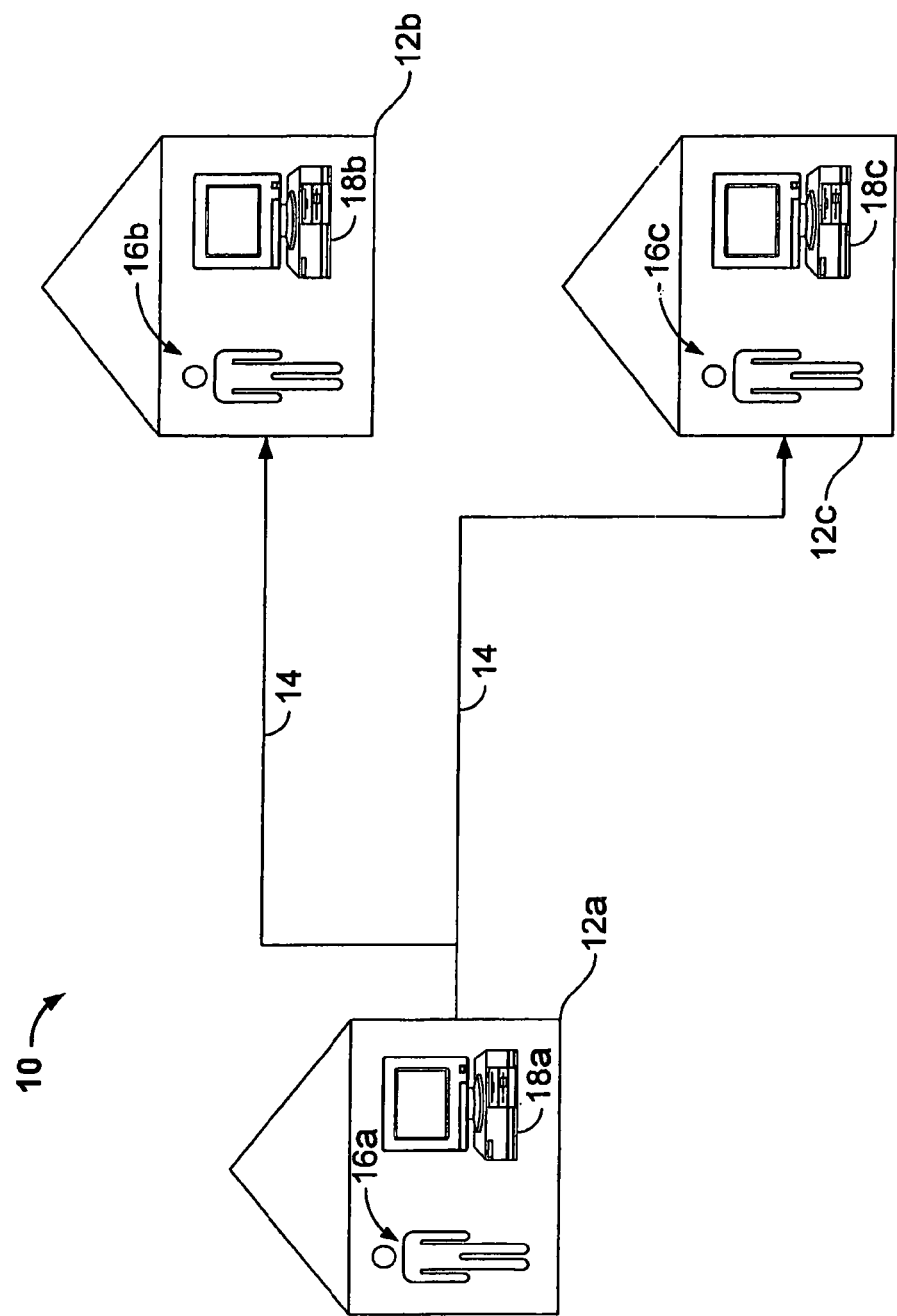
FIG. 1 illustrates an intentional presence system in accordance with one embodiment of the present invention.

FIG. 1 illustrates an intentional presence system 10 in accordance with one embodiment of the present invention. The intentional presence system 10 includes a number of households 12a, 12b, 12c connected by a number of data lines 14. Each household 12a, 12b, 12c includes a user 16a, 16b, 16c and an intentional presence device 18a, 18b, 18c. Each of the users 16a, 16b, 16c is able to communicate his or her presence to the other users 16a, 16b, 16c in different households 12a, 12b, 12c by using the intentional presence devices 18a, 18b, 18c.

The term presence encompasses a category of short signals or messages that users agree to interpret as meaning things such as: "I'm thinking of you," or "I'm home," or "Please call me." An intentional presence device 18a, 18b, 18c communicates a user's presence by sending the appropriate data through the data lines 14 to a receiving intentional presence device 18a, 18b, 18c. The data line is any communication line that is configured to transfer data such as a phone line, a serial cable, an Ethernet line, or an Internet connection. Then, the receiving intentional presence device 18a, 18b, 18c delivers the message to the receiving user 16a, 16b, 16c.

It will therefore be apparent that an intentional presence system 10 in accordance with the present invention includes a transmitting device at a first physical location 12a that is responsive to a command intentionally initiated by a first individual 16a at the first physical location to develop a presence signal on data line 14 intended for a second individual 16b at a second physical location 12b. The intentional presence system further includes a receiving device 18b located at the second physical location 12b which is receptive to the presence signal and which is operative to generate an indication to the second individual 16*b* of the first individual's 16*a* presence with respect to the transmitting device 18*a*.

It will therefore also be apparent that a method for intentionally signaling a presence in accordance with the present invention includes transmitting from a first physical location in response to a command intentionally initiated by a first individual at the first physical location a presence signal intended for a second individual at a second physical location; and receiving at the second physical the presence signal and generating an indication to the second individual of the first individual's presence. The method preferably also includes transmitting from the second physical location in response to a command intentionally initiated by the second individual at the second physical location a second presence signal intended for the first individual at the first physical location, and receiving at the first physical location the second presence signal and generating an indication to the first individual of the second individual's presence.

It is important to the present invention that the presence signal is intentionally sent by the sending party. This is primarily for privacy reasons. If, for example, a mechanism were provided to send a presence signal automatically, such as a proximity sensor, then the system would be a remote monitoring system rather than a remote presence messaging system. Most individuals are reluctant to have their presence monitored and automatically relayed to other individuals, even if they are socially close to those other individuals. The present invention therefore requires the sending individual to actively initiate the generation of the presence signal.

In an alternative embodiment of the present invention, the transmitting device 18*a* is a first transmitting device, the receiving device 18*b* is a first receiving device, and the presence signal is a first presence signal on the data lines 14. This alternative embodiment further includes a second transmitting device 18*b* at the second physical location that is responsive to a command intentionally initiated by the second individual 16*b* at the second physical location to develop a second presence signal intended for the first individual 16*a* at the first physical location, and a second receiving device 18*a* located at the first physical location 12*a* which is receptive to the second presence signal and which is operative to generate an indication to the first individual 16*a* of the second individual's 16*b* presence with respect to the second transmitting device 18*b*.

Figure 2:
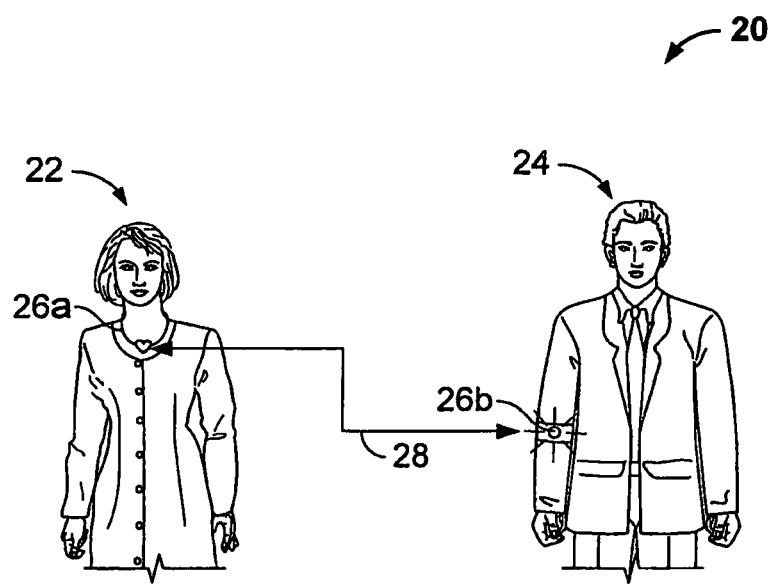
FIG. 2 illustrates a dyad intentional presence system in accordance with one embodiment of the present invention.

FIG. 2 illustrates a dyad intentional presence system 20 in accordance with one embodiment of the present invention. By "dyad" it is meant two people who are in a close relationship such as best friends, or a husband and wife pair. The dyad intentional presence system 20 includes a first user 22 and a second user 24 each of who possess a portable intentional presence module 26*a* and 26*b*. The portable intentional presence modules 26 may be housed in many different aesthetic forms, such as a necklace, a wristband and other everyday items, and are coupled together by a communication channel 28. The communication channel 28 is preferably wireless, such as a radio transmission channel.

Figure 3:
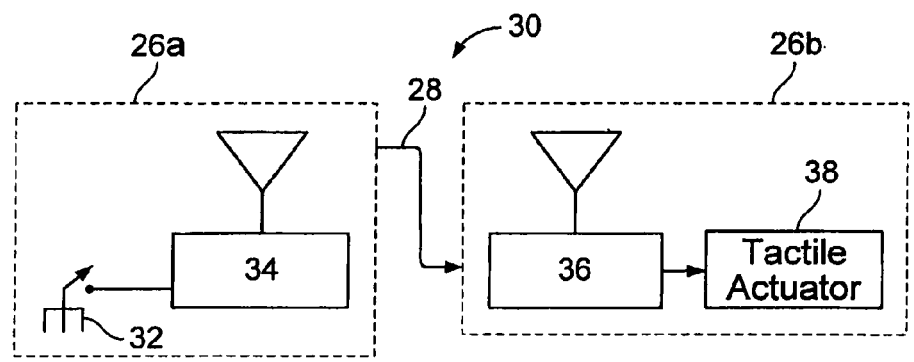
FIG. 3 illustrates one embodiment of a tactile actuator system that is used in to communicate presence messages in the dyad intentional presence system.

FIG. 3 illustrates one embodiment of a tactile actuator system 30 that is used in to communicate presence messages in the dyad intentional presence system 20. To use the tactile actuator system 30, the first user 22 activates her portable intentional presence module 26*a* by flipping a switch 32. The switch 32 causes a transmitter 34 to send a signal to a receiver 36 through a communication channel 28 (also illustrated in FIG. 2), which is preferably wireless. The receiver 36 then communicates a presence message to user 24 through a tactile actuator 38.

Figure 4:
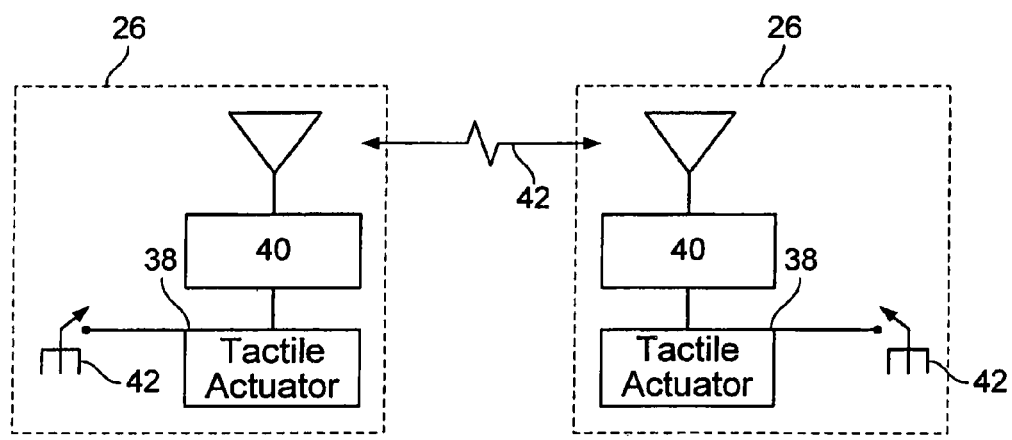
FIG. 4 illustrates another embodiment of a tactile actuator system that is used to communicate presence messages in the dyad intentional presence system.

FIG. 4 illustrates another embodiment of a tactile actuator system 30' that is used to communicate presence messages in the dyad intentional presence system 20. The tactile actuator system 30' includes a pair of transceivers 40, each of which include a switch 42 and a tactile actuator 38. The transceivers 40 are capable of sending and receiving presence messages 40 through a two directional communication means 42. When a signal is received by a transceiver 40 from the other transceiver 40, the tactile actuator 38 (a variety of which are described in FIGS. 8A-E below) is activated to communicate a presence message.

Figure 5:
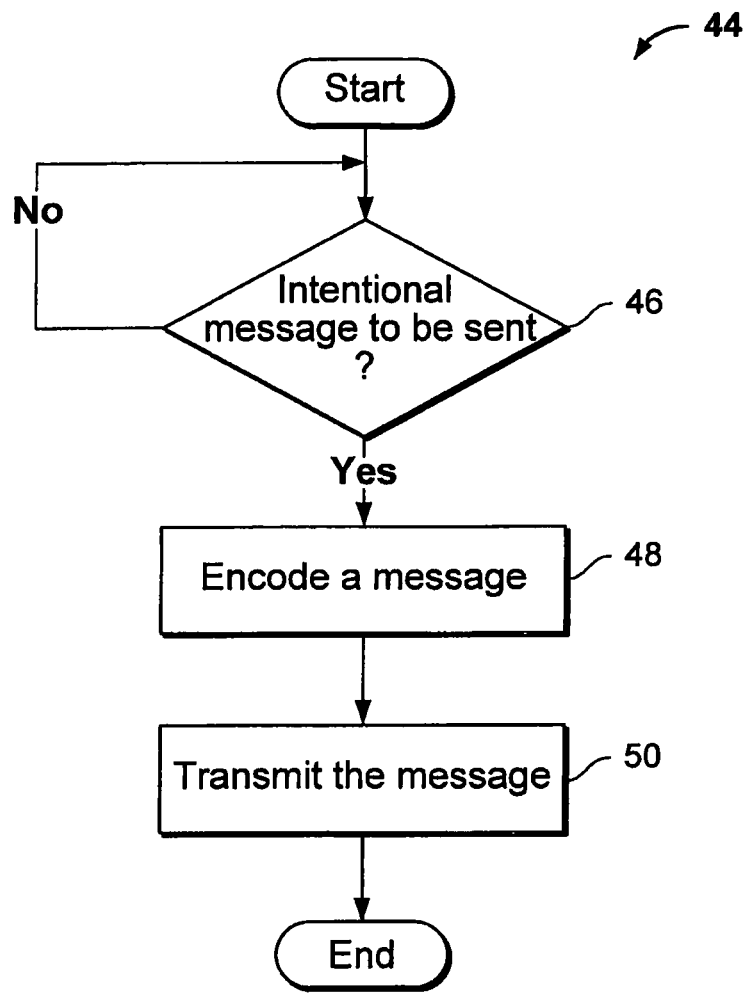
FIG. 5 is a flow chart of a method for sending an intentional message in accordance with one embodiment of the present invention.

FIG. 5 is a flow chart of a method 44 for sending an intentional message in accordance with one embodiment of the present invention. The method 44 starts at an operation 46 in which a user determines whether or not an intentional message will be sent. If a message is not to be sent, operation 46 repeats itself. If the user decides to send a message, then the method 44 proceeds to an operation 48 that encodes the message. The message is then transmitted in an operation 50.

Figure 6:
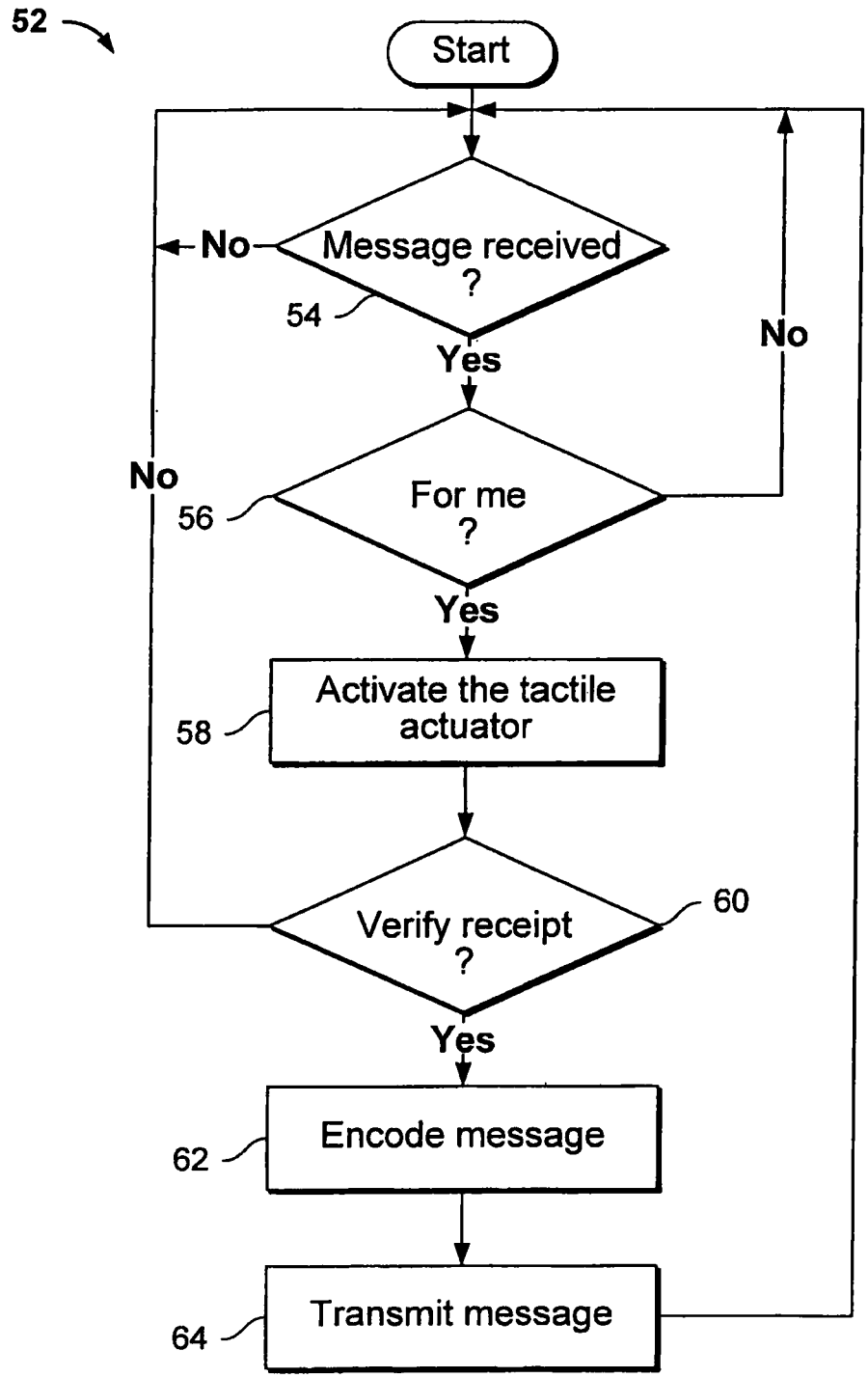
FIG. 6 is a flow chart of a method for receiving an intentional message in accordance with one embodiment of the present invention.

FIG. 6 is a flow chart of a method 52 for receiving an intentional message in accordance with one embodiment of the present invention. The method 52 starts at an operation 54 that determines if a message was received. If a message was not received, then operation 54 repeats itself, continuing to monitor for new messages. If a message was received, the method 52 proceeds to an operation 56 that determines whether the message received was intended for the recipient. If the message does not include the recipient's identification number, then the method 52 starts over at operation 54.

Upon determining that the message is intended for the recipient, an operation 58 notifies the recipient by activating the tactile actuator. In an operation 60, the recipient determines whether she wants to send a confirming message back to the sender. If she does not want to verify receipt, the method 52 repeats from operation 54. If she decides to verify receipt, the confirming message is encoded in an operation 62 and transmitted in an operation 64, after which the method 52 repeats from operation 54.

Figure 7:
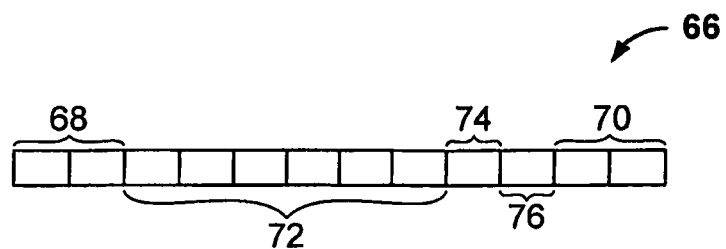
FIG. 7 illustrates an exemplary data packet that is transmitted between the intentional presence modules of FIG. 3.

FIG. 7 illustrates an exemplary data packet 66 that is transmitted between the intentional presence modules 26 of FIG. 3. The data packet 66 includes a header 68 and a tail 70, which indicate to a receiver where the data packet 66 begins and ends. The data packet 66 also includes a user identification number 72, a verification bit 74 and a parity bit 76. The user identification number 72 allows the receiver to determine whether the data packet 66 is intended for the recipient. The verification bit 74 allows the recipient to confirm to the sender that the message has been received.

Figure 8A:
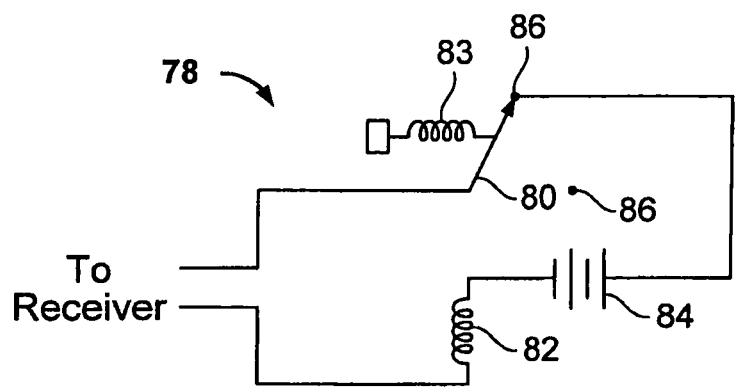
FIGS. 8A, 8B, 8B', 8C, 8D and 8E illustrate several embodiments of tactile actuators.
Figure 8B:
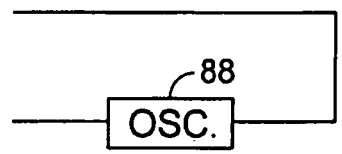
Figure 8B:

FIGS. 8A-8E illustrate several embodiments of tactile actuators 38. FIG. 8A illustrates a circuit diagram of a buzzer 78. The buzzer 78 includes a vibration member 80, an electro magnetic coil 82, a battery 84, a pair of stops 86 and a spring 83. The vibrator 78 is connected to a receiver. When a presence signal is detected, the receiver closes the loop and the vibrator member 80 moves back and forth between the stops 86 to vibrate the receiver. FIGS. 8B and 8B' illustrate two embodiments of tactile actuators 38 including an oscillator 88 and a piezo electric buzzer 90.

Figure 8C:
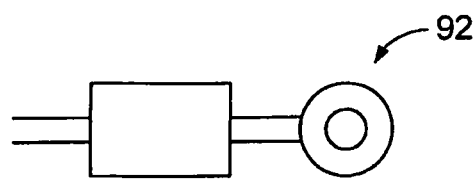
Figure 8D:
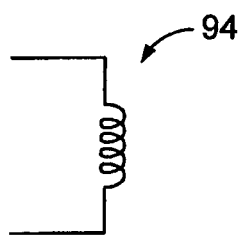
Figure 8E:
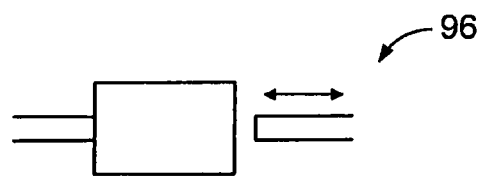

FIG. 8C illustrates a cuff mechanism 92 that produces tactile feedback by squeezing the arm or leg of a user. FIG. 8D illustrates a resistance coil 94 that radiates heat to the user when activated. FIG. 8E illustrates a solenoid 96 that operates tactilely by poking the user. For ease of illustration only five examples of tactile actuators are shown, however as is well known in the art, there are many other permutations of tactile actuation that would be suitable to send a presence message to a recipient in the spirit of the present invention.

Figure 9A:
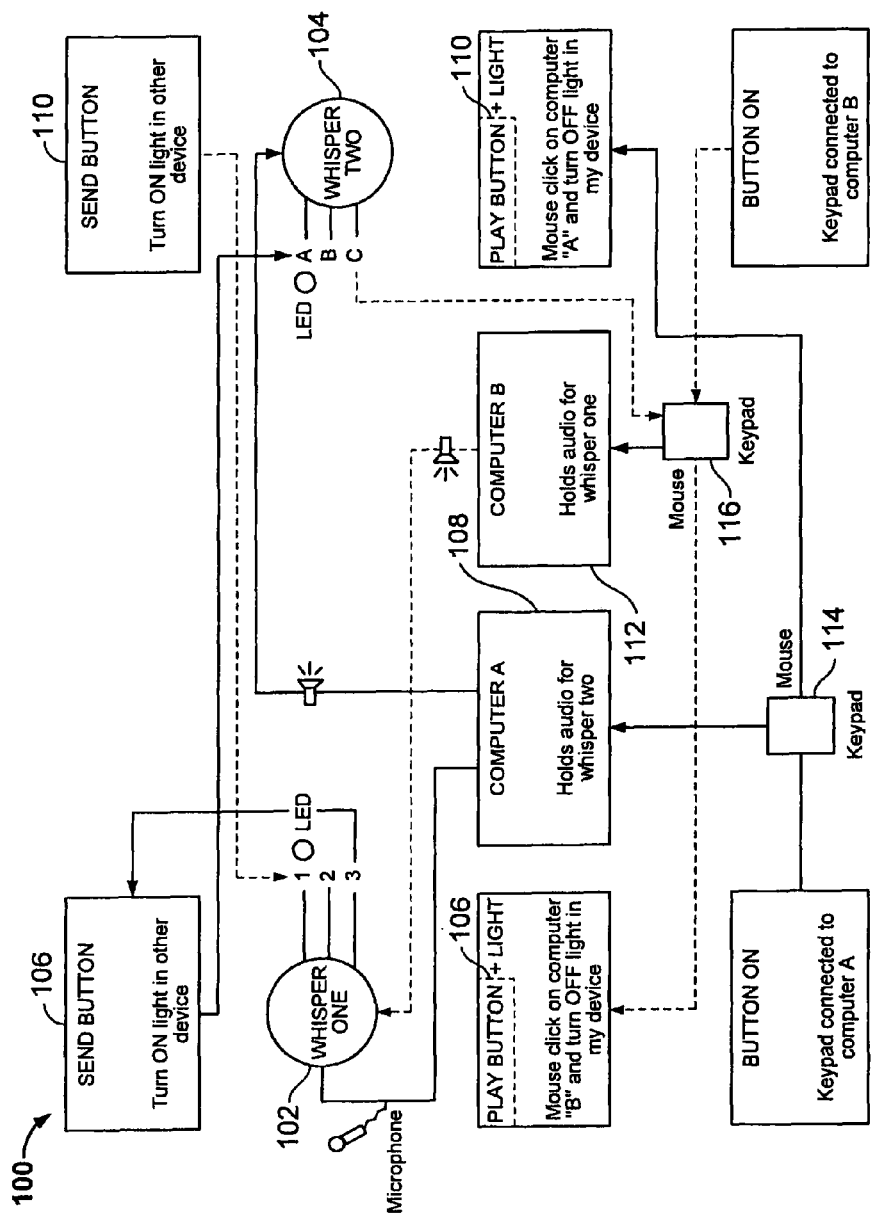
FIG. 9A is a diagram of a Whisper system in accordance with one embodiment of the present invention.

FIG. 9A is a diagram of a Whisper™ system 100 in accordance with one embodiment of the present invention. The system 100 includes a Whisper One unit 102 and a Whisper Two unit 104. The Whisper One unit 102 includes a number of control buttons 106 and a first computer 108. The Whisper Two unit 104 includes a number of control buttons 110 and a second computer 112. The first computer 108 is connected to a first input device 114. The second computer 112 is connected to a second input device 116. The computers 108 and 112, and the input devices 114 and 116 are located outside of the Whisper units 102 and 104. However, they may be placed within the Whisper units 102 and 104 to produce a portable embodiment of the Whisper system 100.

Figure 9B:
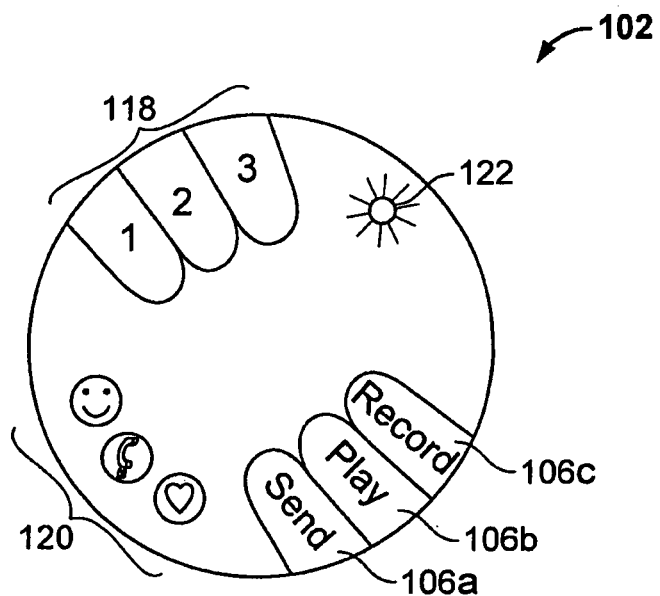
FIG. 9B illustrates the Whisper One unit.

FIG. 9B illustrates the Whisper One unit 102. The Whisper One unit 102 includes a set of control buttons 106a, 106b, 106c, a set of programmable message buttons 118, a set of standard message buttons 120, and an indicator light 122. The set of control buttons 106 include a send button 106a, which sends pointers to audio messages which are identified by message buttons 118 and 120. The set of control buttons also includes a play button 106b, which plays received messages, and a record button 106c to record audio messages.

Each recorded audio message is identified by the set of programmable message buttons 118. The set of standard message buttons 120 automatically triggers a popular standard message. For example, one of the standard message buttons 120 could trigger the audio message, "Please call me," and another standard message button 120 could trigger the message, "I am happy," or I am sad." The indiCator light 122 signals the user when a message is received and ready to be played by the Whisper One unit 102.

Figure 9C:
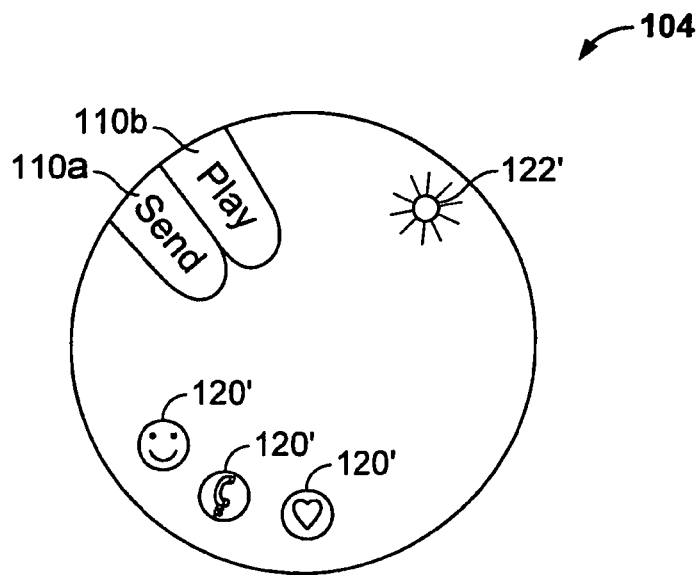
FIG. 9C illustrates the Whisper Two unit.

FIG. 9C illustrates the Whisper Two unit 104. The Whisper Two unit 104 includes a set of control buttons 110a, 110b, a set of standard message buttons 120', and an indicator light 122'. The Whisper Two unit 104 can be identical to the Whisper One unit 102, but in this example the Whisper•Two unit 104 is less complex than the Whisper One unit 102 and lacks the capability to record messages. The set of control buttons 110 includes a play button 110a and a send button 110b that furicfion in the same as in the Whisper One unit 102.

Using Whisper is much like finding little notes that a significant other has hidden for a user. However, in the case of Whisper, the notes are audio messages the significant other has pre-recorded onto a device. One person can then remotely "unveil" each audio note she has prepared for her significant other by causing the message to be "played". In addition the users may send standard messages to each other at a touch of the button to intentionally communicate or acknowledge presence as well as to send short replies.

Figure 10:
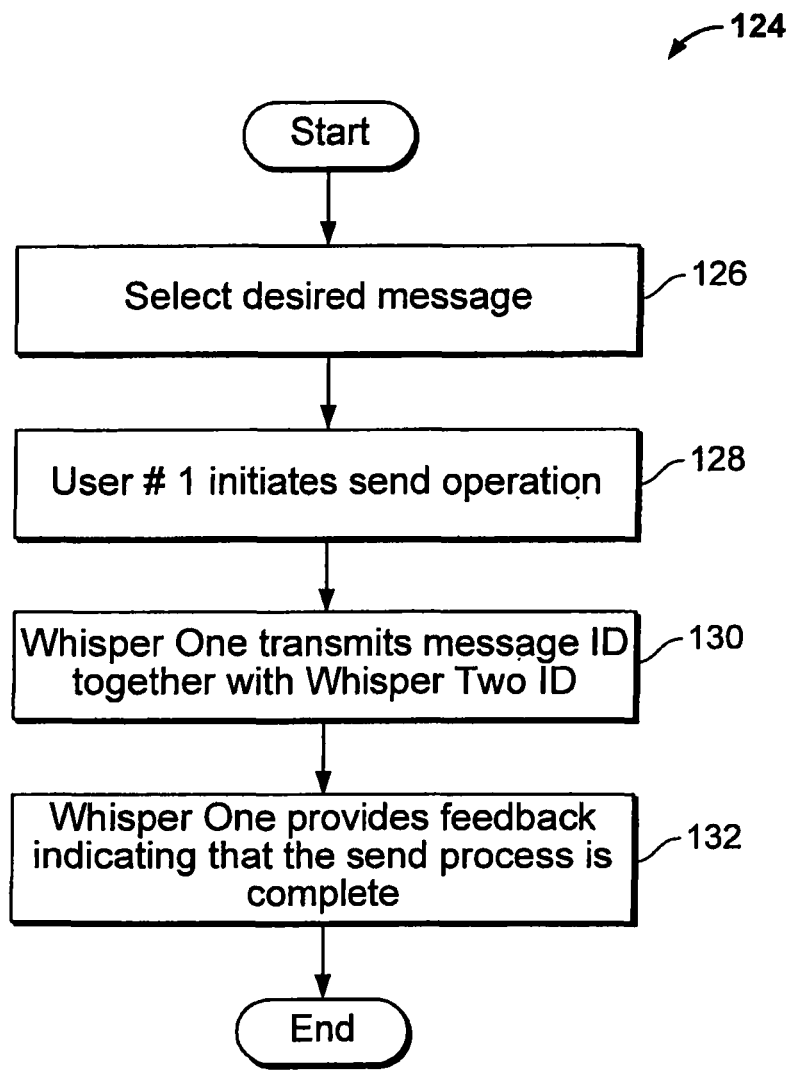
FIG. 10 is a flow chart of a method for sending a message using a Whisper One unit in accordance with one embodiment of the present invention.

FIG. 10 is a flow chart of a method 124 for sending a message using a Whisper One unit in accordance with one embodiment of the present invention. The method 124 starts at an operation 126 where a user #1 selects the desired message to be sent by using either a programmable message button or a standard message button. Then, the user #1 initiates a send operation 128 by pressing the send button. In an operation 130, the Whisper One unit transmits the message along with the Whisper Two unit identification. The method 124 ends after the Whisper One unit provides feedback to user #1 indicating that the message has been sent in an operation 132.

Figure 11:
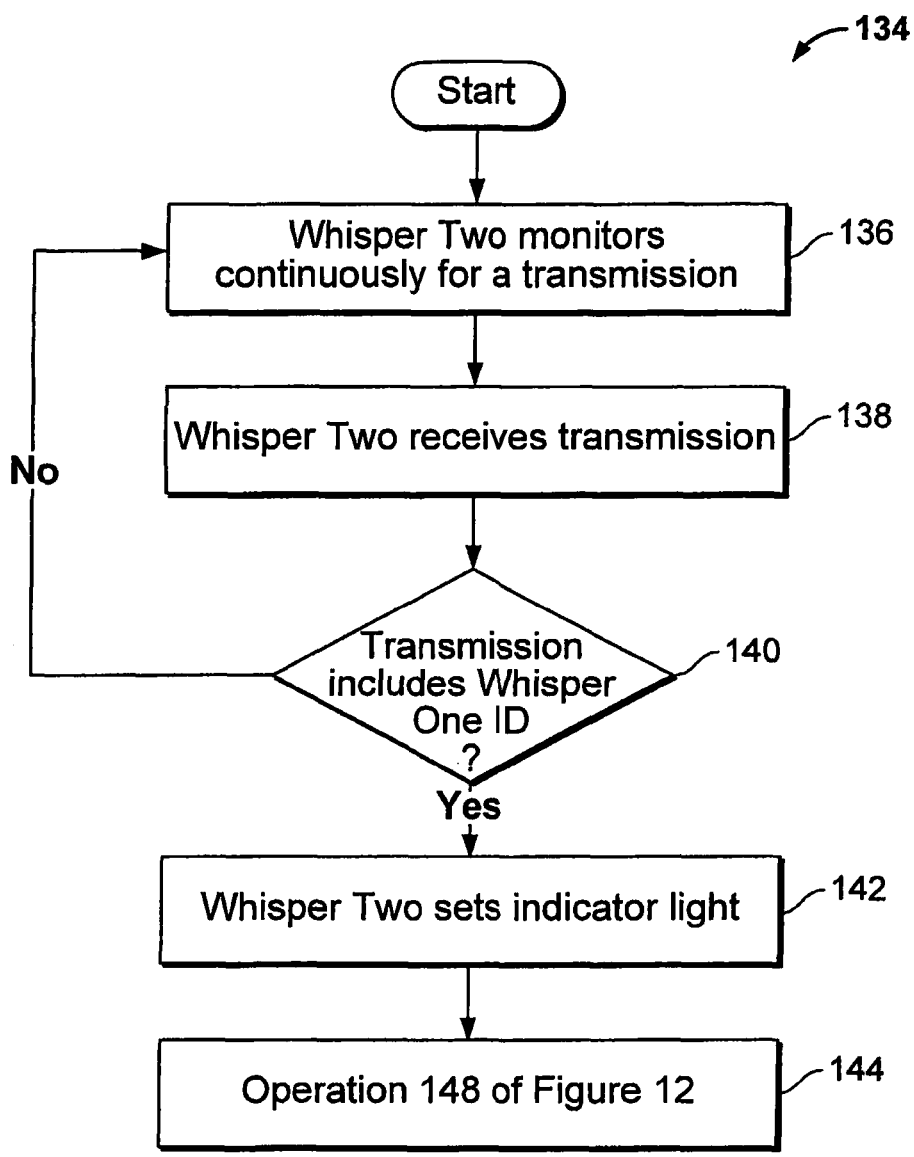
FIG. 11 is a flow chart of a method for receiving a message using a Whisper Two unit in accordance with one embodiment of the present invention.

FIG. 11 is a flow chart of a method 134 for receiving a message using a Whisper Two unit in accordance with one embodiment of the present invention. The method 134 starts at an operation 136 where the Whisper Two unit is continuously monitoring for a transmission from the Whisper One unit. The Whisper Two unit receives a transmission in an operation 138 and immediately proceeds to an operation 140 to determine whether the transmission includes the Whisper One identification.

If the correct identification is not in the transmission, then the method 136 returns to operation 136. If the Whisper One identification is included in the transmission, the Whisper Two unit sets the indicator light to let a user #2 know that a message has been received in an operation 142. The method 134 then ends at an operation 144 by proceeding to an operation 148 shown and described in FIG. 12.

Figure 12:
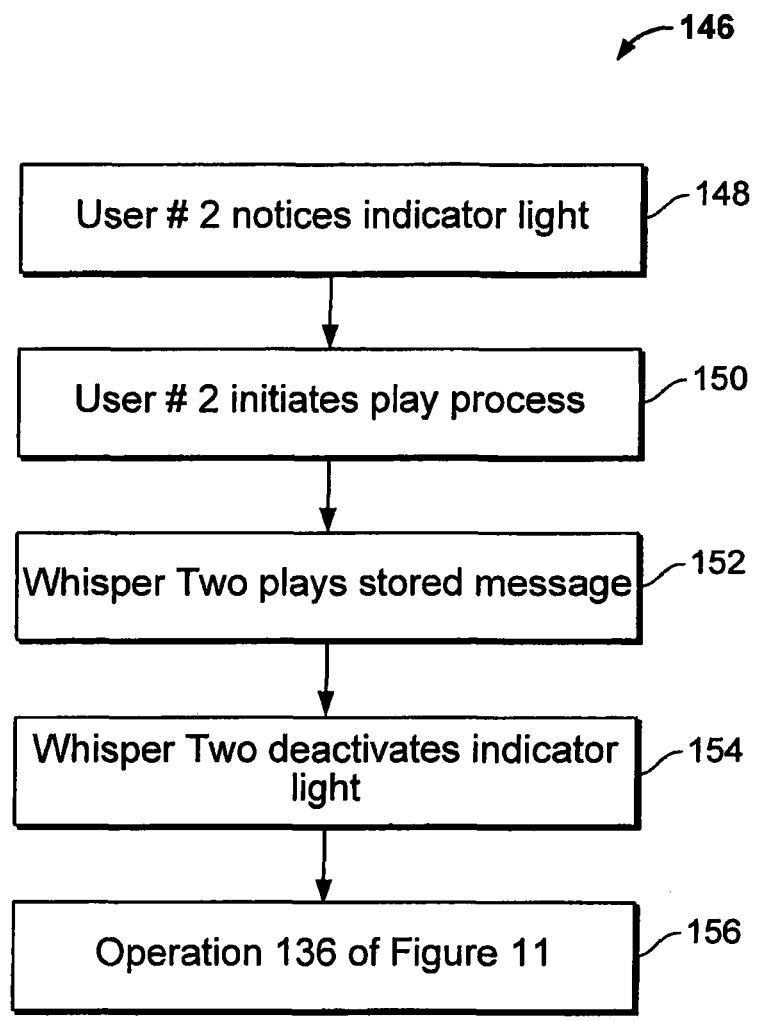
FIG. 12 is a flow chart of a method for listening to the message sent in method of FIG. 11.

FIG. 12 is a flow chart of a method 146 for listening to the message sent in method 134 of FIG. 11. The method 146 starts at an operation 148 when user #2 notices the indicator light. When user #2 wants to listen to the message, she proceeds to an operation 150 and initiates the play process by pressing the button. The Whisper Two unit then plays the stored message in an operation 152. After playing the message, the Whisper Unit deactivates the indicator light in an operation 154. The method 146 ends in an operation 156 by returning to operation 136 in method 134 of FIG. 11.

Figure 13:
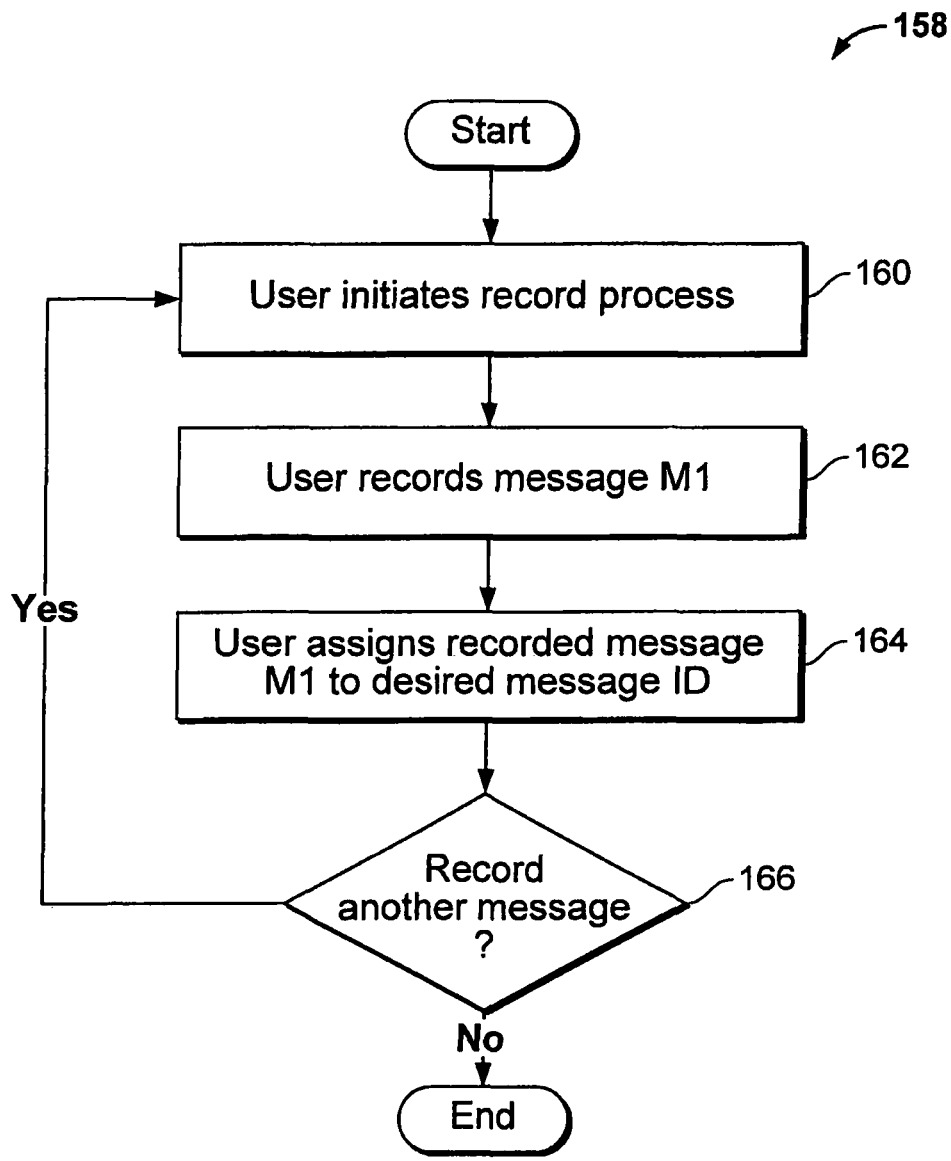
FIG. 13 is a flow chart of a method for recording a message Whisper One unit.

FIG. 13 is a flow chart of a method 158 for recording a message in the Whisper One unit. The method 158 starts at an operation 160 when the user decides to initiate the record process. In an operation 162, the user presses the record button and speaks into the Whisper One unit to record the message. Then the user presses one of the programmable message buttons to assign an identification (M1) to the message in an operation 164. After the message is recorded, the user determines whether or not to record another message in an operation 166. If the user chooses to record another message, the method 158 repeats itself at operation 160. If not, the method 158 ends.

Pager Peripherals™ are an embodiment of the present invention that includes small, wireless devices that allow personal and ephemeral connections to communities of interest. These devices could be disposable. They can be like tokens, and could use any available wireless network. They are either embedded or attached, and either stationary or mobile. "Embedded" refers to the wireless communication unit being embedded within the device (and invisible to the user), whereas "attached" refers to the wireless communication unit being separate from the peripheral. An example of an attached peripheral is a device that the pager sits in, with a light that blinks upon receipt of a page.

The embedded and stationary type of pager peripheral includes appliances communicating with the house control panel, or houseplant containers communicating the need for fresh water. The embedded and mobile type includes locators built into golf balls, cat collars, PDAs and buses that indicate they're. approaching. Attached and stationary devices include a docking device for pagers. Attached and mobile devices include various "filtering" ideas, such as using caller ID technology, that emphasize certain topical pages, such as when a special TV show was being broadcast, or when an elderly parent was paging for assistance.

Friends can agree to wear or carry a pair of matched pager peripherals (MPP). These MPPs can send a message to each person if the two MPPs are within a short distance of each other. Therefore, the intentional affiliation that these devices make possible is location or proximity based. Similar, self-selected affiliations are possible between individuals, between an individual and groups, between individuals and desired services, between children and parents, etc.

Figure 14:
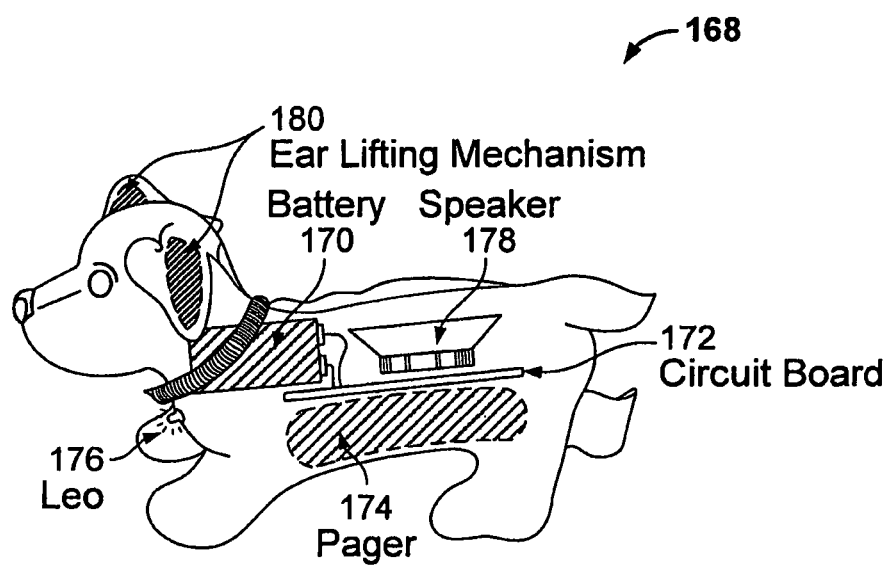
FIG. 14 illustrates a pager peripheral puppy, in accordance with one embodiment of the present invention.

FIG. 14 illustrates a pager peripheral puppy 168, in accordance with one embodiment of the present invention. The pager peripheral puppy 168 is a stuffed toy dog that has been modified to have a wireless pager activated sound playback system that includes a battery 170, a circuit board 172, a pager 174 a light-emitting diode (LED) 176, and a speaker 178. The stuffed toy dog is used to associate a page received on the pager peripheral puppy 168 to a predetermined event.

When a page (by phone or e-mail) is sent to the pager peripheral puppy 168, the pager 174 triggers the playback of a pre-recorded sound on the circuit board 172 through the speaker 178 to indicate to the user that an event is occurring. The sound (such as that of a dog barking) is stored on a chip in the custom circuit board 172. At the same time, the LED 176 is lit as another indicator to the user that an event is occurring. The LED 176 will stay on until the pager peripheral puppy 168 is reset. In addition, an ear lifting mechanism 180 may be included as yet another indicator of receiving a page of the predetermined event.

Figure 15A:
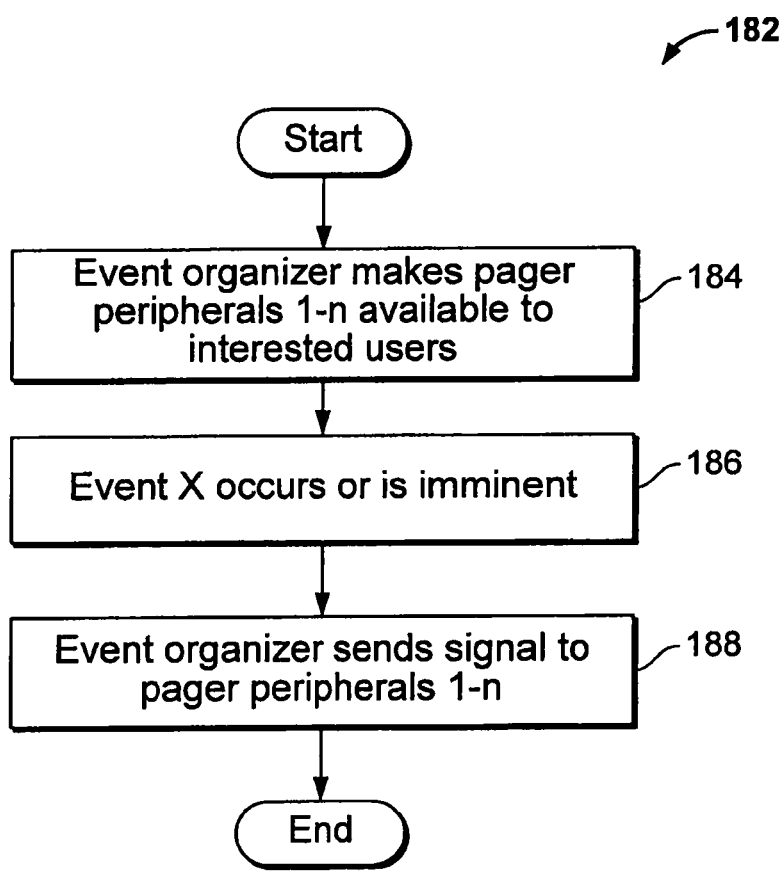
FIG. 15A is a flow chart of a method of initiating and organizing a pager peripheral event.

FIG. 15A is a flow chart of a method 182 of initiating and organizing a pager peripheral event. The method 182 starts at an operation 184 when the event organizer makes an n number of pager peripherals (such as the pager peripheral puppy 168 in FIG. 14A) available to interested users. A certain amount of time passes until event X occurs or is imminent in an operation 186. Then in an operation 188, the event organizer sends a signal to pager peripherals 1-n to inform users of the event.

Figure 15B:
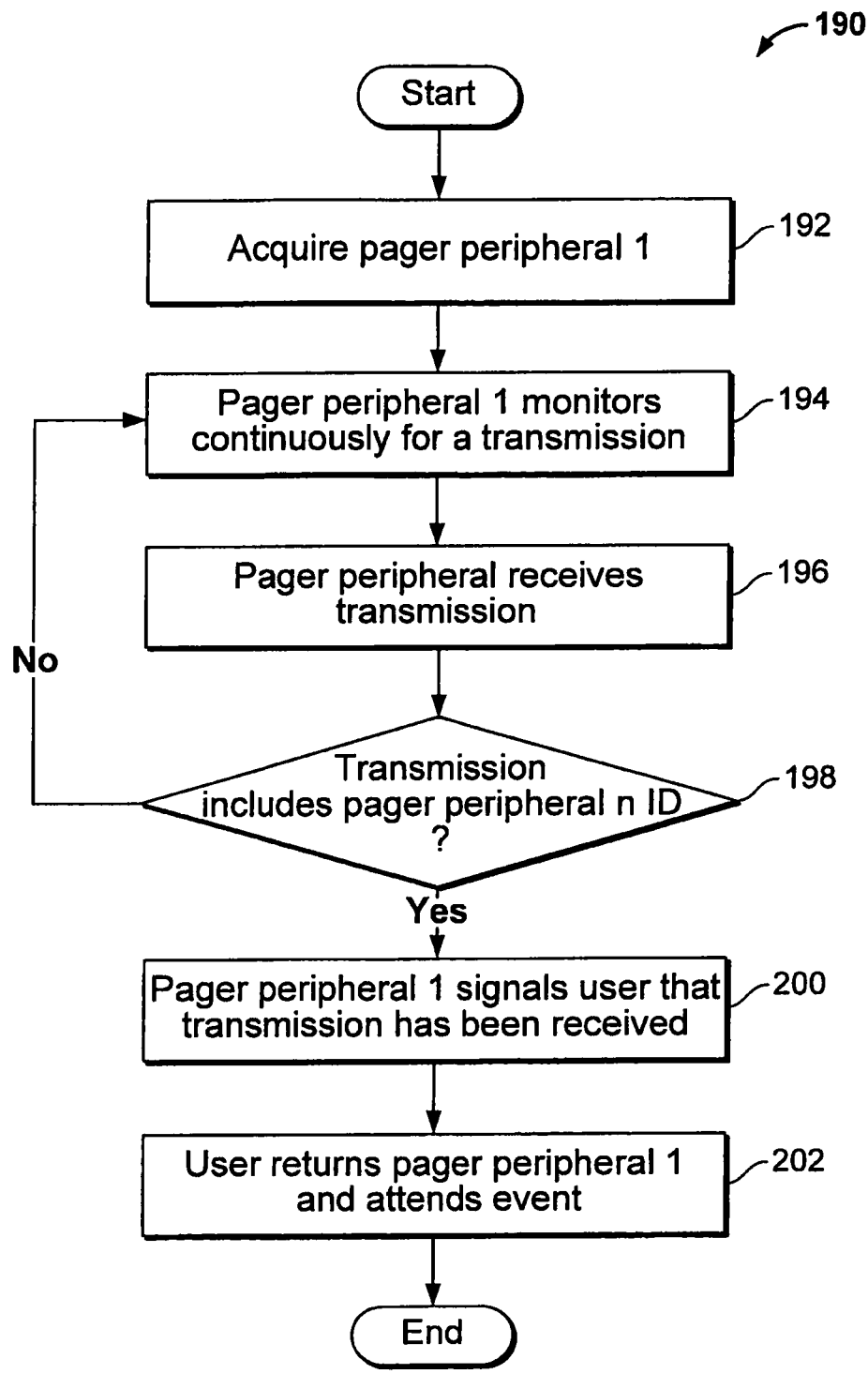
FIG. 15B is a flow chart of a method of using a pager peripheral.

FIG. 15B is a flow chart of a method 190 of using a pager peripheral. The method 190 begins at an operation 192 when the user acquires a pager peripheral. In an operation 194, the pager peripheral monitors continuously for a transmission indicating the event that the user is interested in. When the pager peripheral receives a transmission in an operation 196, the pager peripheral determines in an operation 198 whether or not the transmission includes the proper pager peripheral n 115. If the ID is in the transmission, the method 190 proceeds to an operation 200, otherwise the method 190 returns to operation 194. In an operation 200, the pager peripheral signals to the user that the transmission has been received. The user then returns the pager peripheral and attends the event in an operation 202.

Figure 16:
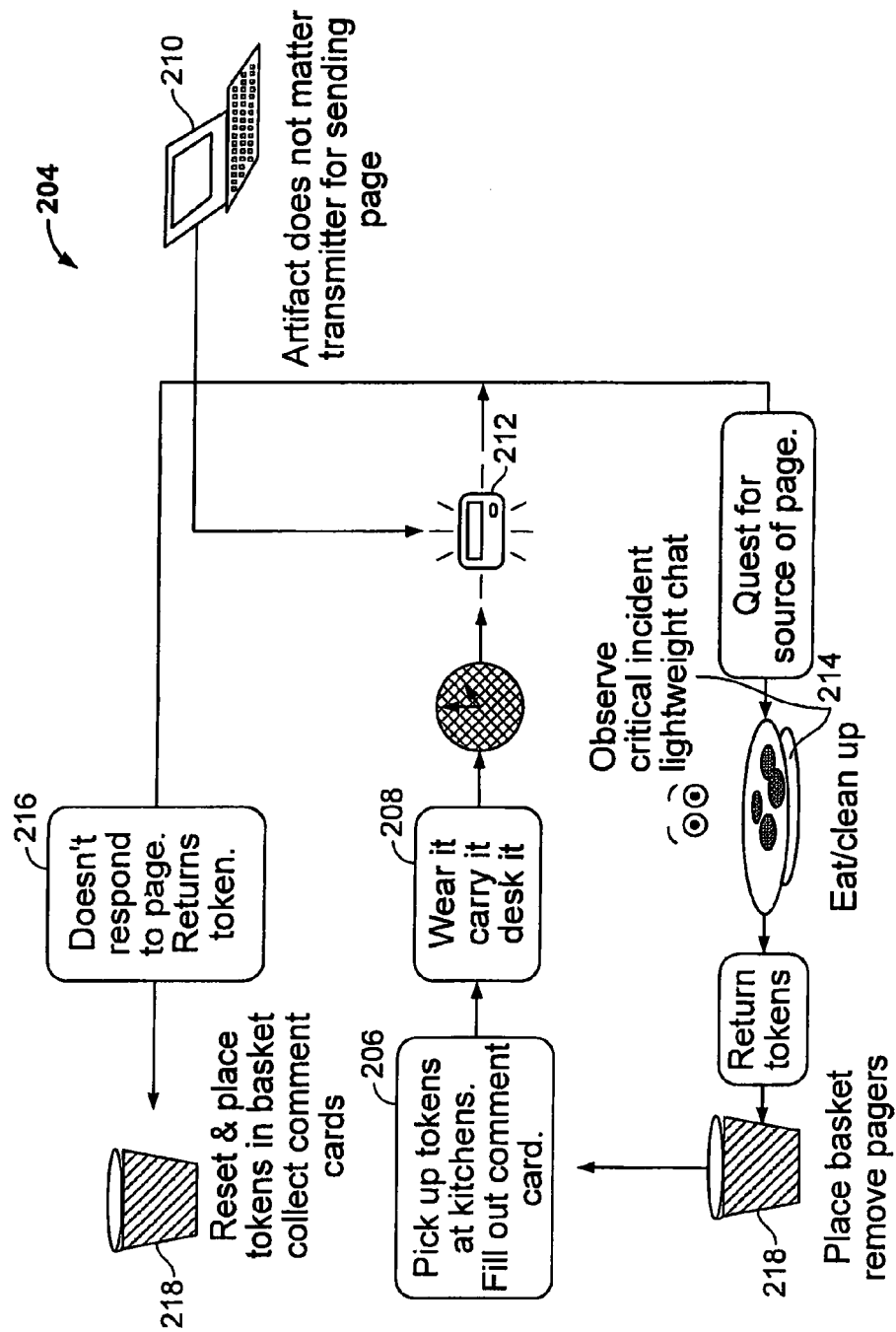
FIG. 16 is a flow diagram of a method for using "Go For It" tokens.

Another PP embodiment is a "Go For It" token, which is a wireless device, embedded in a mobile token. FIG. 16 is a flow diagram of a method 204 for using "Go For It" tokens. In an operation 206, the user retrieves a token from the kitchen. Before the token is actually used, the user is free in an operation 208 to do whatever she wants with it. Depending on the physical embodiment of the token, the user may choose to wear it, carry it or put it in her desk.

In an operation 210, a transmitter signals the token. The token then displays an audible, visible or tactile indication such as displaying the message "Go For It" (or any other message appropriate to the pre-arranged event or type of event) in an operation 212. The indication alerts the user to a certain event such as a meeting or lunch. Then the user can respond to the message in an operation 214 by attending the event. The user can also choose not to respond in an operation 216. From either operation 214 or 216, the user can proceed to a final operation 218 of returning the tokens to their original source.

Figure 17:
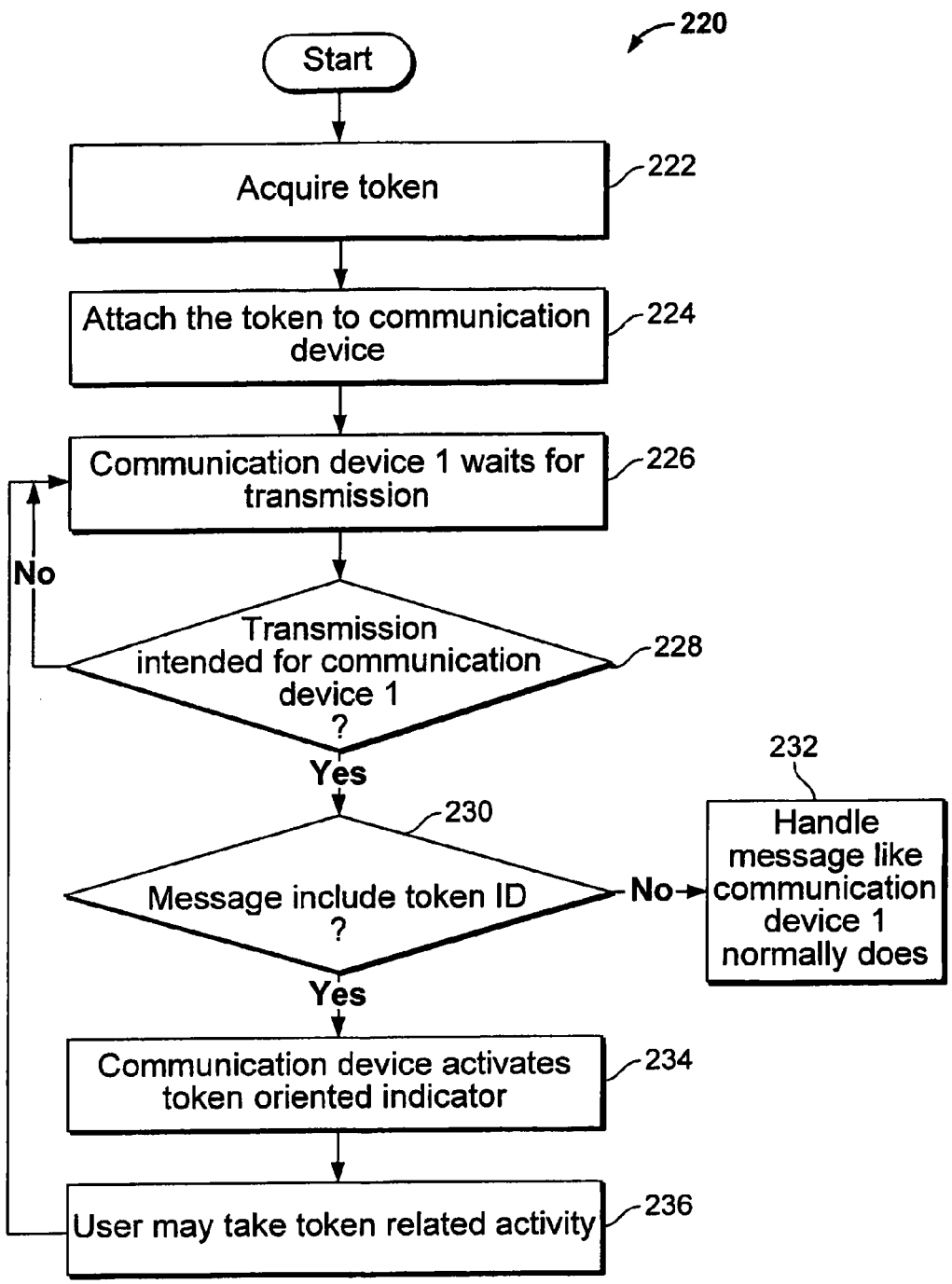
FIG. 17 is a flow chart of a method for using a "Go For It" token.

FIG. 17 is a flow chart of a method 220 for using an attached/mobile "Go For It" token. The method 220 starts at an operation 222 where the token is acquired. The token is then attached to a communication device in an operation 226 such as a pager. After the token has been given to the user, the communication device waits for transmission in an operation 226. If a transmission is received, an operation 228 determines whether the transmission was intended for the Communication device. If not, the method 220 repeats from operation 226.

If the transmission is intended for the communication device, an operation 230 determines whether the message includes the token ID. If not, an operation 232 handles the message normally. If for example, the communication device is a pager, then it functions like a normal pager in operation 232. If the token ID is included, then the communication device activates the token oriented indicator in an operation 234. The user may then take the token related activity 236. The methol 1-220 will then repeat from operation 226 to await further transmission.

The Intentional Presence Lamp™ (IPL) is yet another embodiment of the present invention. The IPL's functions to enable geographically separated friends or family to have an indication of the other's presence in their own home. Through research, it was discovered that users preferred a presence appliance that was intentionally manipulated to relay presence over one that did so automatically and therefore without a user's consent. In the Intentional Presence Lamp, there is no active sensing taking place. A user's presence is communicated to other parties only if the user decides to let them know by activating the device.

Figure 18:
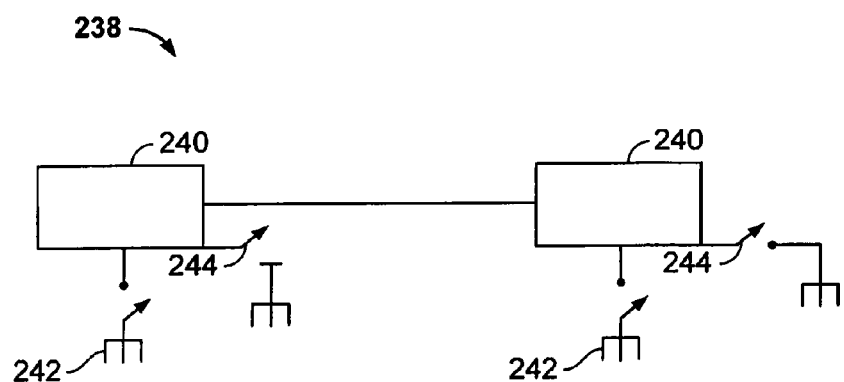
FIG. 18 is a system diagram of an 1PL system.

FIG. 18 is a system diagram of an IPL system 238. The IPL system 238 includes a pair of display devices 240. The display devices 240 each include an on/off switch 242, and an intentional representation switch 244 that changes the presence communicated between display devices 240.

Figure 19:
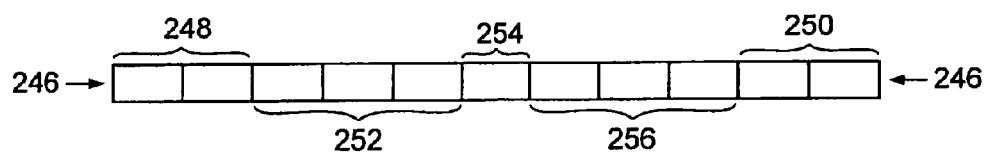
FIG. 19 is a diagram of a data packet that is transmitted between display devices.

FIG. 19 is a diagram of a data packet 246 that is transmitted between display devices 240. The data packet 246 includes a header 248, a tail 250, a display device identification number 252, a presence representation bit 254 and an appearance type identification 256. The header 248 and the tail 250 indicate the beginning and the end of the data packet 246.

Figure 20:
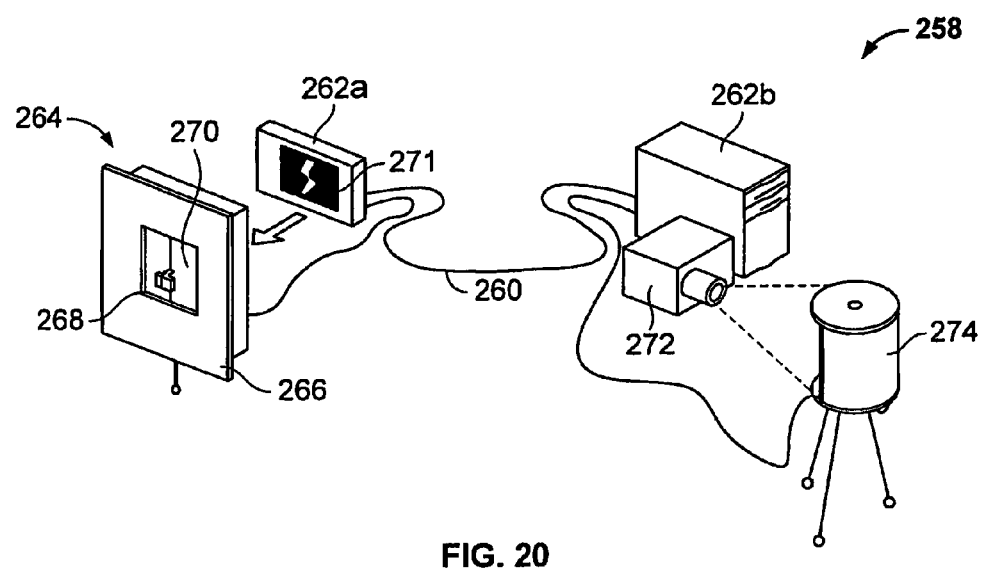
FIG. 20 illustrates the configuration of Intentional Presence Lamp system in accordance with one embodiment of the present invention.

FIG. 20 illustrates the configuration of Intentional Presence Lamp 258 system in accordance with one embodiment of the present invention. A network 260 connects the microprocessor systems 262. Microprocessor system 262a is a pen-based tablet PC with a display 271 that fits inside an IPL curtain 264. The curtain 264 includes a frame 266, a window 268 and drapes 270. IPL images 272 on the PC's display 271 can be seen in the window 268. If the drapes 270 are opened, the user will see some activity on the display 271, whether he is alone or "with somebody."

Figure 21:
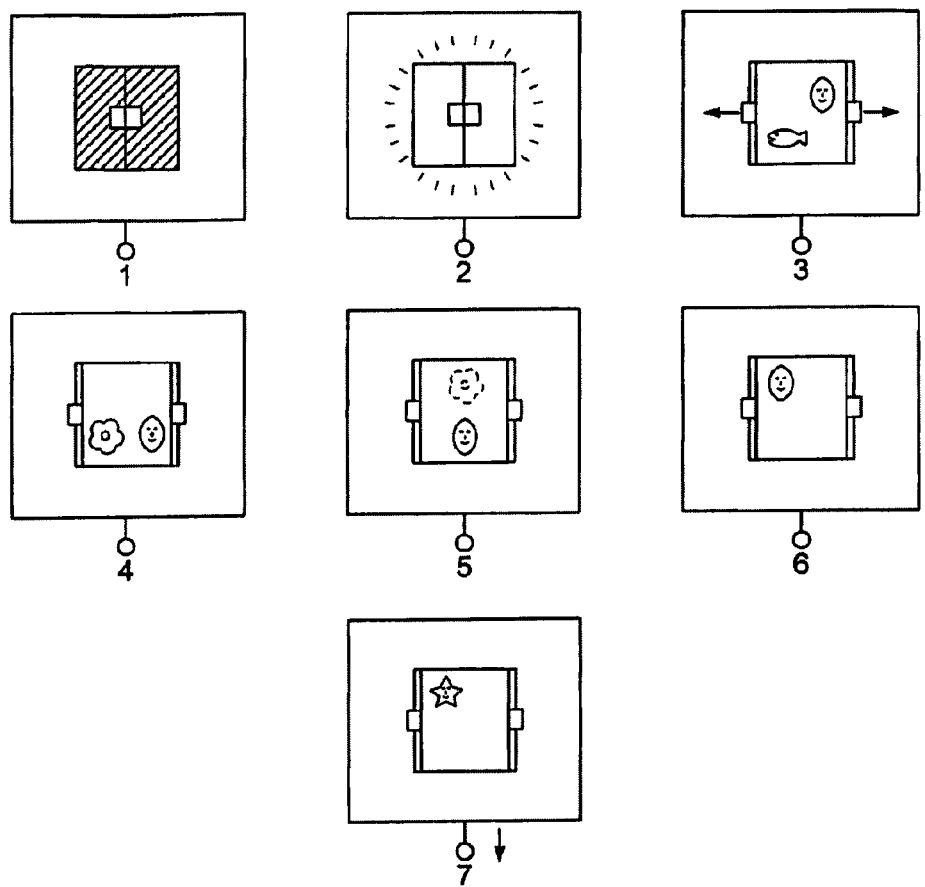
FIG. 21 illustrates several modes of display of the curtain embodiment of the Intentional Presence Lamp and the possible messages conveyed by each display.

Users are represented by images of objects including a picture of their face. These images float around the display 270 in a slow and random motion. Users select from a range of objects to change their representation both locally and on counterpart devices as shown in FIG. 21. Table 1 (below) describes the numbered images of FIG. 21. Microprocessor system 262b drives a projector 272 projecting an image onto a lampshade 274. The lampshade 274 serves as a mood light in the home, and as such has a use value no matter if somebody else is present (i.e. connected) or not.

TABLE 1

| Image Number | Description |
|---|---|
| 1 | Curtains closed - no presence at either end |
| 2 | Glow indicates that someone else is present at other end |
| 3 | Open curtains to indicate own presence - see representations of oneself and counterpart(s) |
| 4 | Counterpart changes their representation from 'fish' to 'flower' |
| 5 | Counterpart turns off and their representation starts to fade |

TABLE 1-continued

| Image Number | Description |
| --- | --- |
| 6 | Counterpart's representation fades to nothing over 10 or so minutes |
| 7 | Pull chain to change one's own representation from 'lemon' to 'star' |

Figure 22:
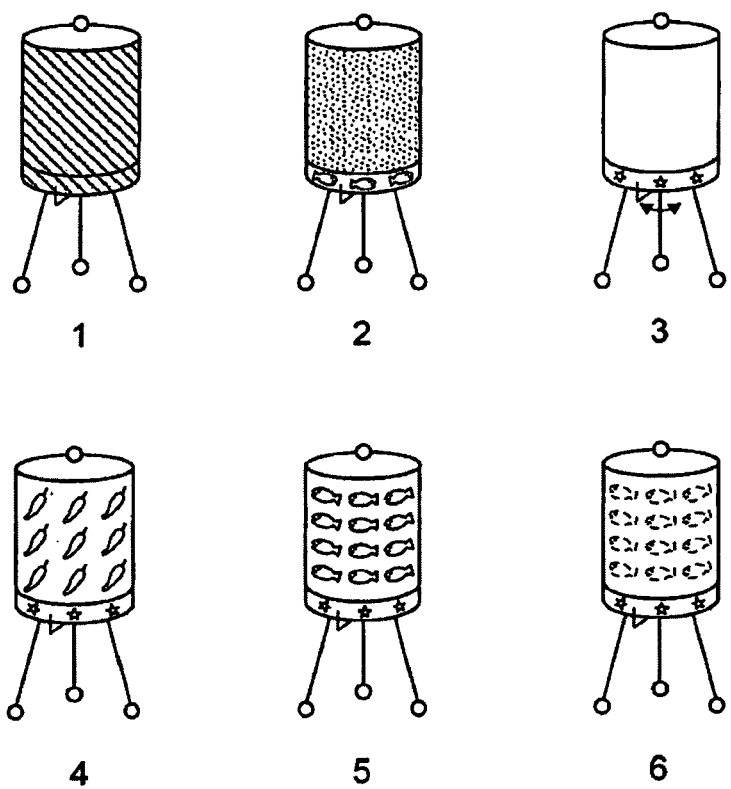
FIG. 22 illustrates several modes of display of the lampshade embodiment of the Intentional Presence Lamp and the possible messages conveyed by each display.

If somebody 'joins', then the lampshade becomes the product of a collaborative decoration effort. The user can choose the appearance of their own lampshade as shown in FIG. 22 by selecting a solid color for the upper 80% and a foreground image for the lower 20% of the shade. The foreground image will be the user's representation on their counterpart's lamp. If the counterpart has a lampshade as well, this image will appear as foreground pattern in the upper 80%. Table 2 (below) describes the numbered lampshades of FIG. 22.

TABLE 2

| Lampshade Number | Description |
| --- | --- |
| 1 | Light off - no presence at this end (unknown status of counterpart) |
| 2 | Turn knob on top to turn light on and indicate own presence |
| 3 | Continue turning knob to change background color. Move lever on bottom to change own representation from 'fish' to 'star' |
| 4 | Counterpart's representation appears in front of background color indicating their presence |
| 5 | Counterpart changes their representation from 'chili' to 'fish' |
| 6 | Counterpart turns off and their representation fades to nothing over 10 or so minutes |

Figure 23:
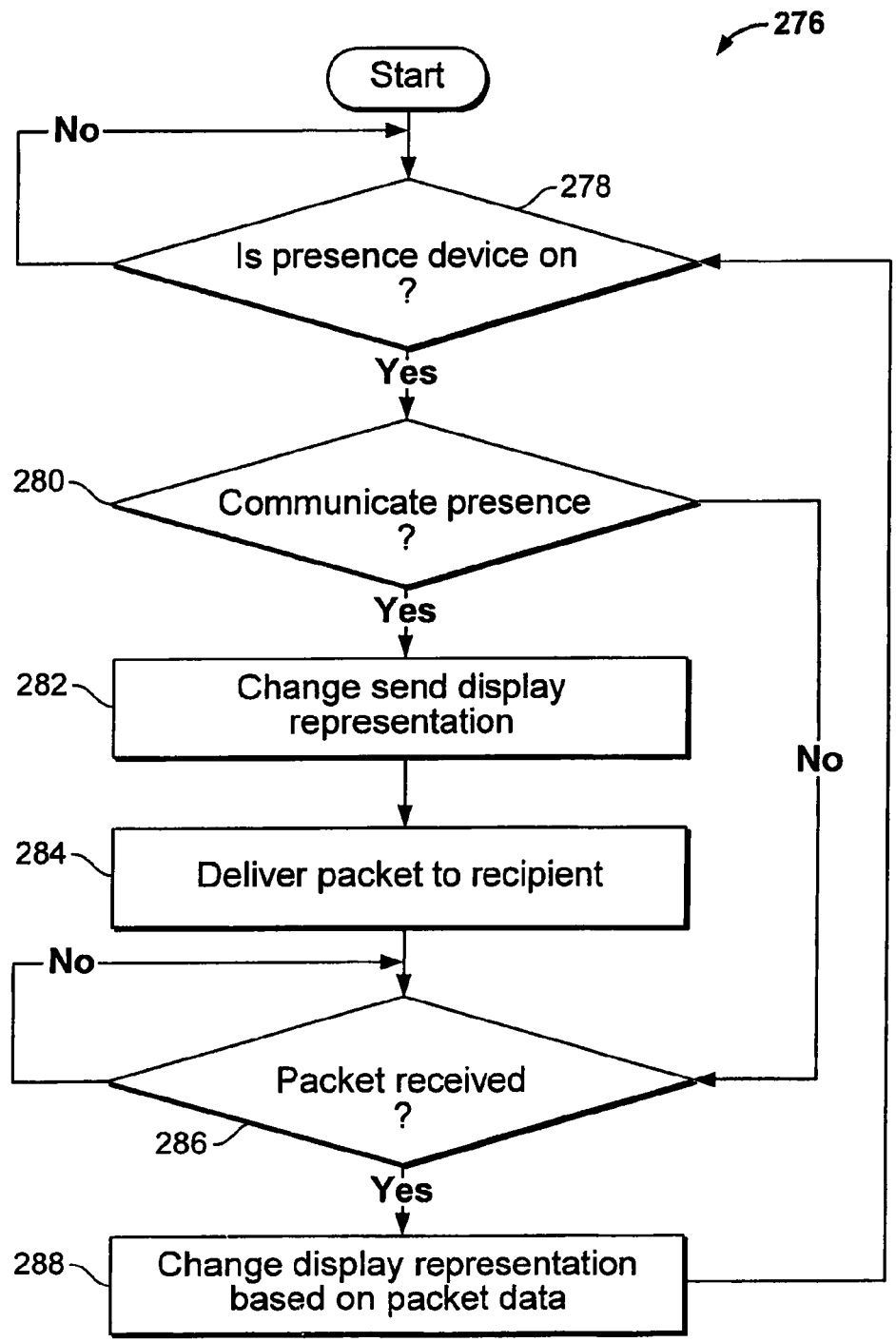
FIG. 23 is a flow chart of a method for intentionally communicating presence in accordance with one embodiment of the present invention.

FIG. 23 is a flow chart of a method 276 for intentionally communicating presence in accordance with one embodiment of the present invention. The method 276 starts at an operation 278, which determines whether the presence device is on. If the presence device is on, then the user may decide whether to communicate her presence to the other user(s) in a method 280. If the user decides to communicate presence, the method 276 proceeds to an operation 282, but if she decides against communicating presence, the method 276 proceeds to an operation 286.

In operation 282, the IPL changes the display representation being sent by delivering a data packet (described in FIG. 19) to the recipient in an operation 284. An operation 286 determines whether or not the packet has been received. If the packet has not been received, operation 286 repeats itself. If a packet has been received, the IPL changes its display representation based on the packet data in a method 288.

Figure 24:
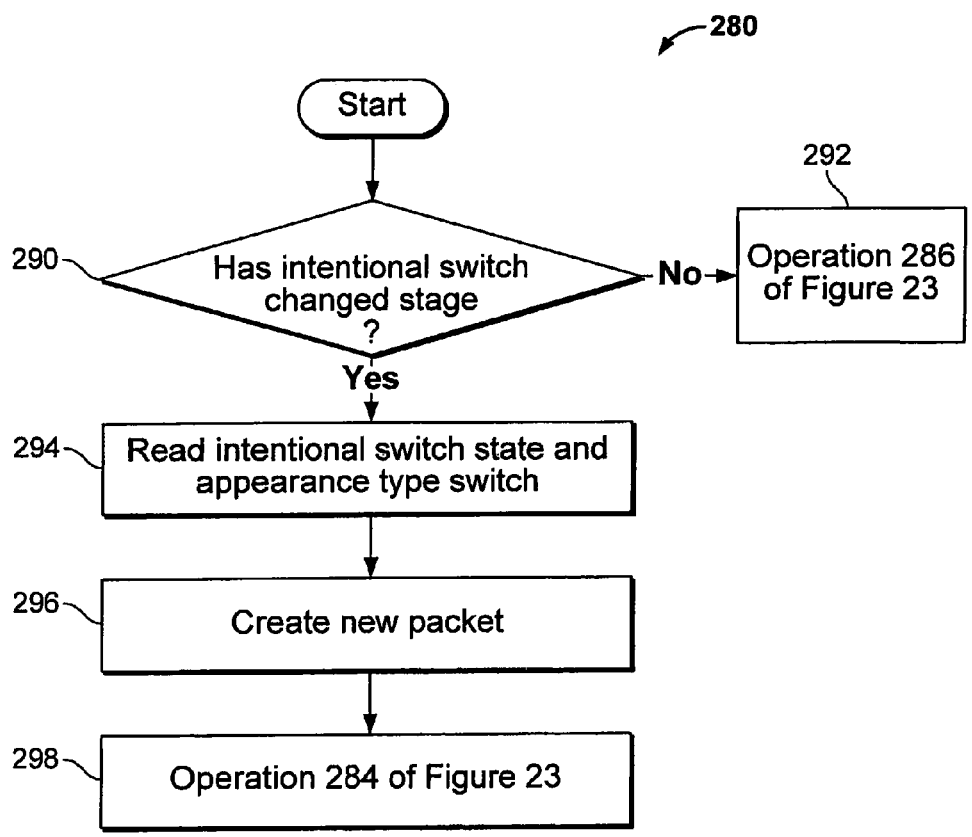
FIG. 24 is a more detailed flow chart of the method of FIG. 23.

FIG. 24 is a more detailed flow chart of method 280 of FIG. 23. The method 280 begins with an operation 290, which determines whether the intentional representation switch has changed state. If the intentional representation switch state has not changed, then an operation 292 exits the method 280 and proceeds with operation 286 of FIG. 23. If the intentional representation switch state has changed, an operation 294 reads the intentional representation switch state and the appearance type switch. A new packet is then created in an operation 296. Finally, an operation 298 exits method 280 and proceeds with operation 284 of FIG. 23.

Figure 25:
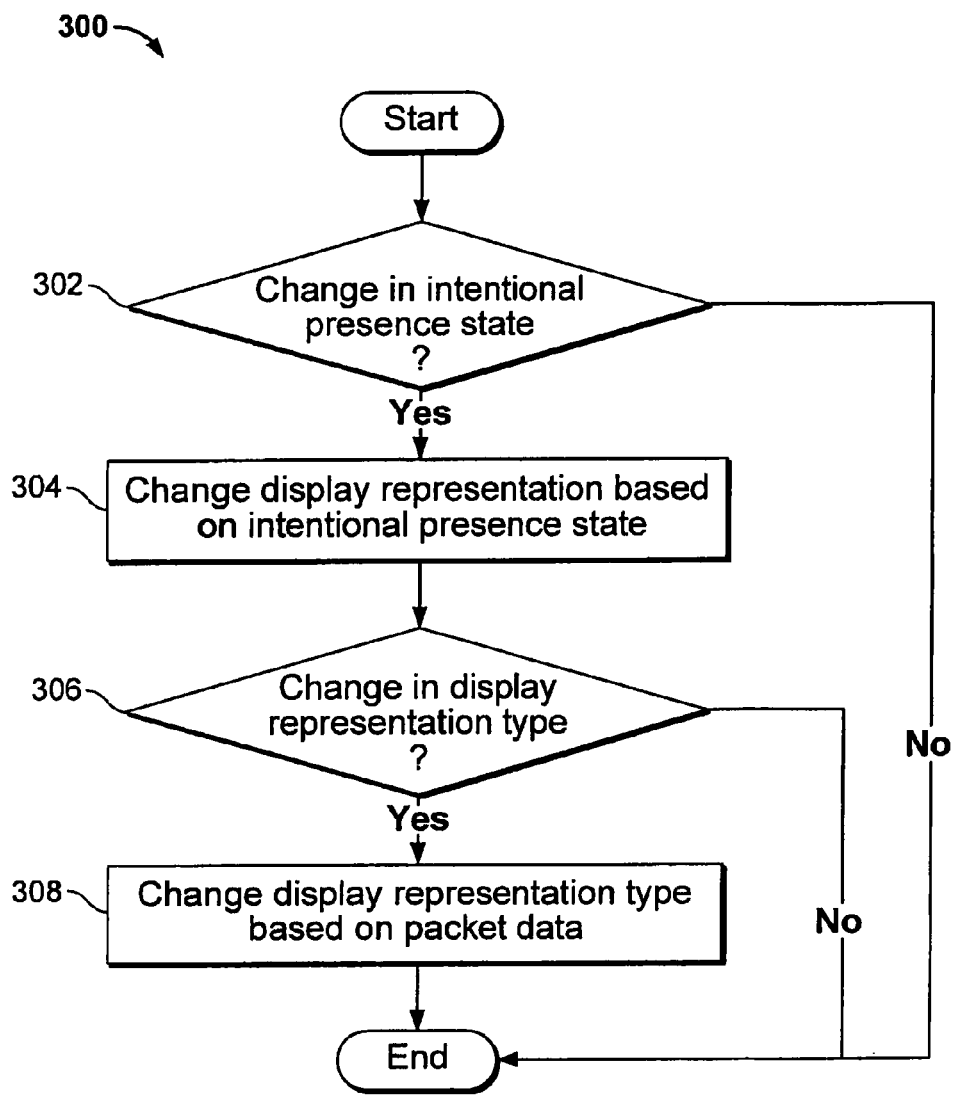
FIG. 25 is another detailed flow chart of the method of FIG. 23.

FIG. 25 is a more detailed flow chart of method 288 of FIG. 23. The method 288 begins with an operation 300, which determines whether there has been a change in the intentional presence state. If there has been no change, the method 288 ends. If there has been a change, then an operation 302 changes the display representation based on the intentional presence state. Then the method 288 proceeds to an operation 304 to determine whether there has been a change in the display appearance type. If there has been no change, then the method 288 ends. If there has been a change, then the method 288 ends by changing the display appearance type based on the packet data.

Interactive Frames™ is another embodiment of the present invention. The idea behind Interactive Frames is to utilize screens, particularly in a common picture frame, to make communication even more personal. Almost every household has several picture frames on the walls containing photos of loved ones and favorite memories. Interactive Frames suggests the idea of turning such picture frames into much more lively and interactive communication devices.

Figure 26:
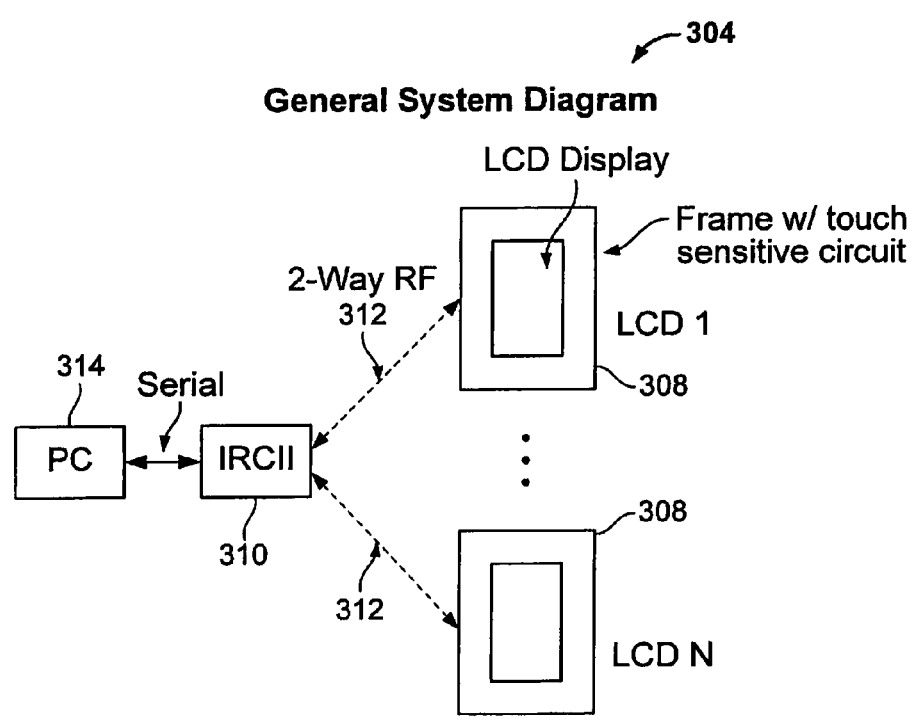
FIG. 26 illustrates a system diagram of an Interactive Frames system in accordance with one embodiment of the present invention.

FIG. 26 illustrates a system diagram of an Interactive Frames system 306 in accordance with one embodiment of the present invention. Two liquid crystal display (LCD) frames 308 the size of an ordinary picture frame are connected to an IRC11 board 310 through a two way RF 312. The IRC11 board 310 acts as a router for the frames 308 by communicating with a PC 314 through the RF 312 and letting the system application know when the frames 308 have been touched and when to send new images to a given frame 308.

Figure 27:
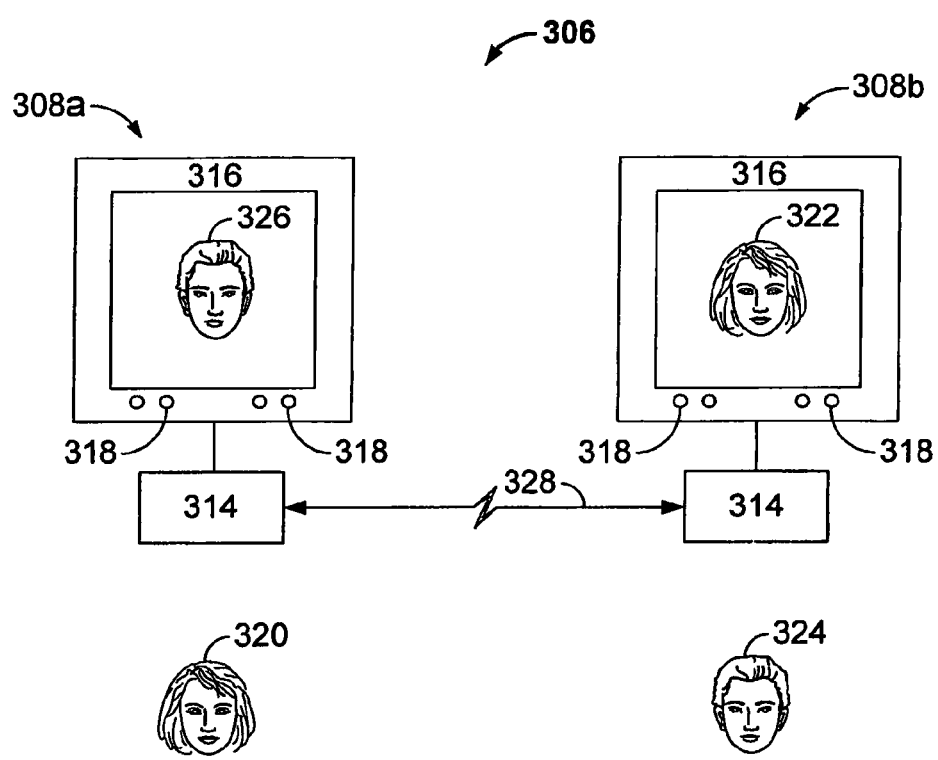
FIG. 27 illustrates the Interactive Frames system from a user perspective.

FIG. 27 illustrates the Interactive Frames system 306 from a user perspective. The Interactive Frames system 306 includes a pair of frames 308*a*, 308*b*. The frames 308*a*-*b* connected to a pair of PCs 314, which communicate through a data line 328. The frames 308 include a touch sensitive edge 316 and a number of control buttons 318. A first user 320 may use her frame 308*a* through either the touch sensitive edge 316 or the control buttons 318 to send her image 322 over to a second user 324 and his frame 308*b*. The second user 324 may also send his image 326 to frame 308*a*.

FrameBoard™ is another embodiment of the Interactive Frame. Push button switches are attached to four separate keys on a computer keyboard. A frame containing a picture of a family member is placed on top of each switch. When the frame is pushed, the computer detects whether it was a frame that was being touched. If so, then an e-mail message was composed and sent to the person pictured in the frame. An example of the content of the message is "Thinking of you," followed by the time the message was sent. Many other types of communication can be sent, including audio message.

Figure 28:
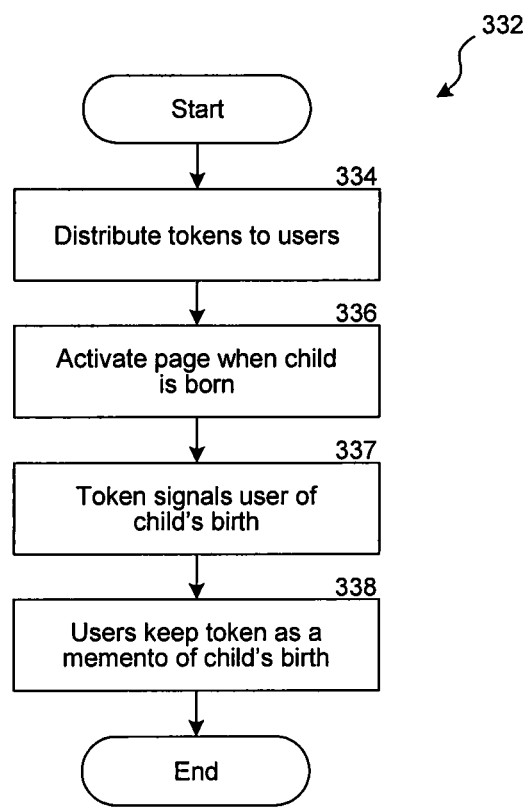
FIG. 28 is a flow chart of another method of using Go For It tokens.

FIG. 28 is a flow chart of another method 332 of using Go For It tokens. In an operation 334, tokens are distributed to friends and family members who are interested in a child's birth. When the baby is born, the parents activate the tokens to indicate to token holders that the child has been born in an operation 336. In operation 337, the token signals to holders that the baby has been born. Token indicators may be visual, audio or tactile, and may also include such important information as the exact time of birth, sex of the child, weight, length, etc. Finally, in an operation 338, token holders can keep the tokens as a memento of the occasion.

Interactive Frames have many practical applications. If the frames hang on the wall in a home as they can serve as typical picture frames that can change their images at the touch of a button. For example, if the user's parents were in town, he can press a button that set all the frames to hold family pictures. On the other hand, if the user's spouse's family were visiting, he can press a button that changes the configuration to have pictures of her family.

Another practical use for Interactive Frames is to link it to the Internet. A frame can be programmed to update web pages and images at specified times or intervals. An example of this would be of the local weather forecast or an image of traffic on the commute home. The frame can also be controlled remotely by a friend. For example, if the user's sister has just given birth to a baby, she can access the Interactive Frame and upload a picture of her child to it.

Another application for Interactive Frames includes home or office security. One of the picture frames on the wall can double as the video image for a security camera at the user's front door. For example, when the doorbell rings, the user can touch the picture frame and it will toggle from a photograph image to a live image from the security camera. Thus, the security camera image is always available, but is hidden to preserve aesthetics.

While this invention has been described in terms of several preferred embodiments, it will be appreciated that those skilled in the art upon reading the preceding specifications and studying the drawings will realize various alterations, additions, permutations and equivalents thereof. It is therefore intended that the present the following appended claims include all such alterations, additions, permutations, and equivalents as fall within the true spirit and scope of the invention.

We claim:

1. A system for providing messages to a user, the system comprising:
   a transmitting device;
   a first indicator interface configured to intentionally trigger a wireless transmission to be transmitted via the transmitting device, wherein—
      the wireless transmission is transmitted via the transmitting device, and
      the wireless transmission indicates one of first messages or second messages,
         wherein the first messages are multiple standard spoken audio messages stored locally on the transmitting device,
         wherein the standard spoken audio messages intentionally communicate, acknowledge presence or provide short replies, and
         wherein the second messages are multiple programmable spoken audio messages pre-recorded by a person and stored locally on a portable device to be carried by the user,
         wherein the second messages are pre-recorded by a person operating the first indicator interface;
   a wireless device configured to continuously monitor for the wireless transmission, wherein—
      the continuous monitoring is performed by the wireless device; and
   a second indicator interface having at least one input button, at least one visual indicator, and an audio output portion,
      wherein the second indicator interface is configured to determine that the wireless transmission is intended for the wireless device,
      wherein the second indicator interface is configured to provide a visual indication, via the visual indicator, to the user that the wireless transmission intended for the wireless device has been received,
      wherein the second indicator interface replays, via the audio output portion, the one of the first or second messages to the user in response to determining that the wireless transmission is intended for the wireless device and in response to receiving actuation of the input button by the user, and,
      wherein the wireless device and the second indicator interface are within the portable device.

2. The system of claim 1 wherein the wireless transmission corresponds to a pointer that causes the playing of one of multiple selected audio messages.

3. The system of claim 1 wherein the transmitting device and the receiving device are matched pairs that only communicate with each other.

4. A method for providing messages to a user, the method comprising:
   transmitting a wireless transmission via a transmitting device comprising a first indicator interface,
      wherein the wireless transmission indicates one of first messages or second messages,
         wherein the first messages are multiple standard spoken audio messages stored locally on the transmitting device,
         wherein the standard spoken audio messages intentionally communicate, acknowledge presence or provide short replies, and
         wherein the second messages are multiple programmable spoken audio messages pre-recorded by a person and stored locally on a portable device to be carried by the user,
         wherein the second messages are pre-recorded by a person operating the first indicator interface;
   continuously monitoring for an indication of the wireless transmission by a wireless device comprising a second indicator interface,
      wherein the second indicator interface is comprised of at least one input button, at least one visual indicator, and an audio output portion,
      wherein the second indicator interface is configured to determine that the wireless transmission is intended for the wireless device,
      wherein the second indicator interface is configured to provide a visual indication, via the visual indicator, to the user that the wireless transmission intended for the wireless device has been received,
      wherein the second indicator interface replays, via the audio output portion, the one of the first or second messages to the user in response to determining that the wireless transmission is intended for the wireless device and in response to receiving actuation of the input button by the user, and
      wherein the wireless device and the second indicator interface are within the portable device.

5. The method of claim 4 wherein the wireless transmission corresponds to a pointer that causes the playing of one of multiple selected audio messages.

6. The method of claim 4 wherein the transmitting device and the receiving device are matched pairs that only communicate with each other.

7. A computer-implemented messaging method, the method performed by a computer system having a processor and a memory, the method comprising:
   transmitting a wireless transmission via a transmitting device comprising a first indicator interface,
      wherein the wireless transmission indicates one of first messages or second messages,
         wherein the first messages are multiple standard spoken audio messages stored locally on the transmitting device, wherein the standard spoken audio messages intentionally communicate, acknowledge presence or provide short replies, and wherein the second messages are multiple programmable spoken audio messages pre-recorded by a person and stored locally on a portable device to be carried by the user, wherein the second messages are pre-recorded by a person operating the first indicator interface;

continuously monitoring for an indication of the wireless transmission by a wireless device comprising a second indicator interface, wherein the second indicator interface is comprised of at least one input button, at least one visual indicator, and an audio output portion, wherein the second indicator interface is configured to determine that the wireless transmission is intended for the wireless device, wherein the second indicator interface is configured to provide a visual indication, via the visual indicator, to the user that the wireless transmission intended for the wireless device has been received, wherein the second indicator interface replays, via the audio output portion, the one of the first or second messages to the user in response to determining that the wireless transmission is intended for the wireless device and in response to receiving actuation of the input button by the user, and wherein the wireless device and the second indicator interface are within the portable device.

8. The computer-implemented messaging method of claim 7 wherein the wireless transmission corresponds to a pointer that causes the playing of one of multiple selected audio messages.

9. The computer-implemented messaging method of claim 7 wherein the transmitting device and the receiving device are matched pairs that only communicate with each other.

* * * * *

UNITED STATES PATENT AND TRADEMARK OFFICE
CERTIFICATE OF CORRECTION

PATENT NO. : 8,509,137 B2  
APPLICATION NO. : 13/209198  
DATED : August 13, 2013  
INVENTOR(S) : Debby Hindus et al.

Page 1 of 1

It is certified that error appears in the above-identified patent and that said Letters Patent is hereby corrected as shown below:

In the Specifications

In column 3, line 65, delete "1PL" and insert -- IPL --, therefor.

In column 7, line 40, delete "furicfion" and insert -- function --, therefor.

In column 9, line 33, delete "115." and insert -- ID. --, therefor.

In column 10, line 9, delete "methol" and insert -- method --, therefor.

Signed and Sealed this  
Twenty-fourth Day of December, 2013

Margaret A. Focarino  
*Commissioner for Patents of the United States Patent and Trademark Office*